(12) United States Patent
Fattal et al.

(10) Patent No.: US 10,705,281 B2
(45) Date of Patent: Jul. 7, 2020

(54) MODE-SELECTABLE BACKLIGHT, METHOD, AND DISPLAY EMPLOYING DIRECTIONAL SCATTERING FEATURES

(71) Applicant: LEIA INC., Menlo Park, CA (US)

(72) Inventors: David A. Fattal, Mountain View, CA (US); Ming Ma, Palo Alto, CA (US); Xuejian Li, Menlo Park, CA (US)

(73) Assignee: LEIA INC., Menlo Park, CA (US)

( * ) Notice: Subject to any disclaimer, the term of this patent is extended or adjusted under 35 U.S.C. 154(b) by 0 days.

(21) Appl. No.: 16/336,100

(22) PCT Filed: Sep. 28, 2017

(86) PCT No.: PCT/US2017/054148
§ 371 (c)(1),
(2) Date: Mar. 23, 2019

(87) PCT Pub. No.: WO2018/067381
PCT Pub. Date: Apr. 12, 2018

(65) Prior Publication Data
US 2020/0018886 A1 Jan. 16, 2020

Related U.S. Application Data

(60) Provisional application No. 62/404,751, filed on Oct. 5, 2016.

(51) Int. Cl.
*F21V 8/00* (2006.01)
(52) U.S. Cl.
CPC .......... *G02B 6/0035* (2013.01); *G02B 6/0055* (2013.01); *G02B 6/0068* (2013.01)
(58) Field of Classification Search
CPC ...... G02B 6/0035–0036; G02B 6/0068; G02B 6/0055; G02B 6/0043; G02B 6/00551;
(Continued)

(56) References Cited

U.S. PATENT DOCUMENTS

| 9,128,226 B2 | 9/2015 | Fattal et al. |
| 9,201,270 B2 | 12/2015 | Fattal et al. |

(Continued)

FOREIGN PATENT DOCUMENTS

| JP | 2006350338 A | 12/2006 |
| JP | 2012226199 A | 11/2012 |
| WO | 2012038856 A1 | 3/2012 |

OTHER PUBLICATIONS

International Search Report and Written Opinion (ISRWO) by International Searching Authority (ISA) Korean Intellectual Property Office (KIPO), dated Jan. 11, 2018 (13 pages) for counterpart PCT Application PCT/US2017/054148.

(Continued)

*Primary Examiner* — Joseph L Williams
*Assistant Examiner* — Jose M Diaz
(74) *Attorney, Agent, or Firm* — J. Michael Johnson

(57) ABSTRACT

A mode-selectable backlight and display employ a plurality of directional scattering features to provide emitted light. The mode-selectable backlight includes a light guide, a first directional scattering feature to provide first emitted light from guided light having a first propagation direction within the light guide in a first operational mode, and a second directional scattering feature to provide second light from guided light having a second propagation direction within the light guide in a second operational mode. The second emitted light comprises a plurality of directional light beams having different principal angular directions from one another and the first propagation direction differing from the second propagation direction. The mode-selectable display further includes a plurality of light sources to provide the guided light and an array of light valves configured to modulate the emitted light as a displayed image.

24 Claims, 9 Drawing Sheets

(58) Field of Classification Search
CPC .... G02B 6/0046; G02B 6/002; G02B 6/0016; G02B 5/0252; G02B 30/26; G02B 30/00
See application file for complete search history.

(56) References Cited

U.S. PATENT DOCUMENTS

| | | |
|---|---|---|
| 9,298,168 B2 | 3/2016 | Taff et al. |
| 9,389,415 B2 | 7/2016 | Fattal et al. |
| 9,459,461 B2 | 10/2016 | Santori et al. |
| 9,557,466 B2 | 1/2017 | Fattal |
| 9,785,119 B2 | 10/2017 | Taff et al. |
| 2006/0291240 A1 | 12/2006 | Kim et al. |
| 2010/0026930 A1 | 2/2010 | Jepsen |
| 2010/0039832 A1 | 2/2010 | Ahlgren et al. |
| 2011/0141395 A1 | 6/2011 | Yashiro |
| 2012/0195072 A1 | 8/2012 | Minami |
| 2012/0257406 A1 | 10/2012 | Minami |
| 2013/0082980 A1 | 4/2013 | Gruhlke et al. |
| 2013/0329301 A1 | 12/2013 | Travis |
| 2014/0198279 A1 | 7/2014 | Yang et al. |
| 2014/0268867 A1 | 9/2014 | Fiorentino et al. |
| 2015/0355403 A1 | 12/2015 | Santori et al. |
| 2016/0195664 A1 | 7/2016 | Fattal et al. |
| 2016/0320620 A1 | 11/2016 | Maimone |
| 2017/0363794 A1 | 12/2017 | Wan et al. |
| 2018/0299608 A1 | 10/2018 | Fattal et al. |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

Reichelt et al.,"Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal of Display Technology, Sep. 2005, pp. 125-140, vol. 1, No. 1.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

Maimone, A., et al., Pinlight Displays: Wide Field of View Augmented Reality Eyeglasses using Defocused Point Light Sources, ACM Transactions on Graphics, Jul. 2014, pp. 89.1-89.11, vol. 33, No. 4, Article 89.

Shun-Wei Liu, et al., Sub-wavelength gratings fabricated on a light bar by roll-to-roll UV embossing process, Optics Express, Jun. 6, 2011, pp. 11299-11311, vol. 19, No. 12.

ABSTRACT
MODE-SELECTABLE BACKLIGHT, METHOD, AND DISPLAY EMPLOYING DIRECTIONAL SCATTERING FEATURES

CROSS-REFERENCE TO RELATED APPLICATIONS

This application is a U. S. national stage patent application filed under 35 U.S.C. § 371 and claims the benefit of priority to International Application No. PCT/US2017/054148, filed Sep. 28, 2017, which claims priority to U.S. Provisional Patent Application Ser. No. 62/404,751, filed Oct. 5, 2016, each of which is incorporated by reference herein in its entirety.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

To overcome the limitations of passive displays associated with emitted light, many passive displays are coupled to an external light source. The coupled light source may allow these otherwise passive displays to emit light and function substantially as an active display. Examples of such coupled light sources are backlights. A backlight may serve as a source of light (often a panel backlight) that is placed behind an otherwise passive display to illuminate the passive display. For example, a backlight may be coupled to an LCD or an EP display. The backlight emits light that passes through the LCD or the EP display. The light emitted is modulated by the LCD or the EP display and the modulated light is then emitted, in turn, from the LCD or the EP display. Often backlights are configured to emit white light. Color filters are then used to transform the white light into various colors used in the display. The color filters may be placed at an output of the LCD or the EP display (less common) or between the backlight and the LCD or the EP display, for example.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Figure 1A:
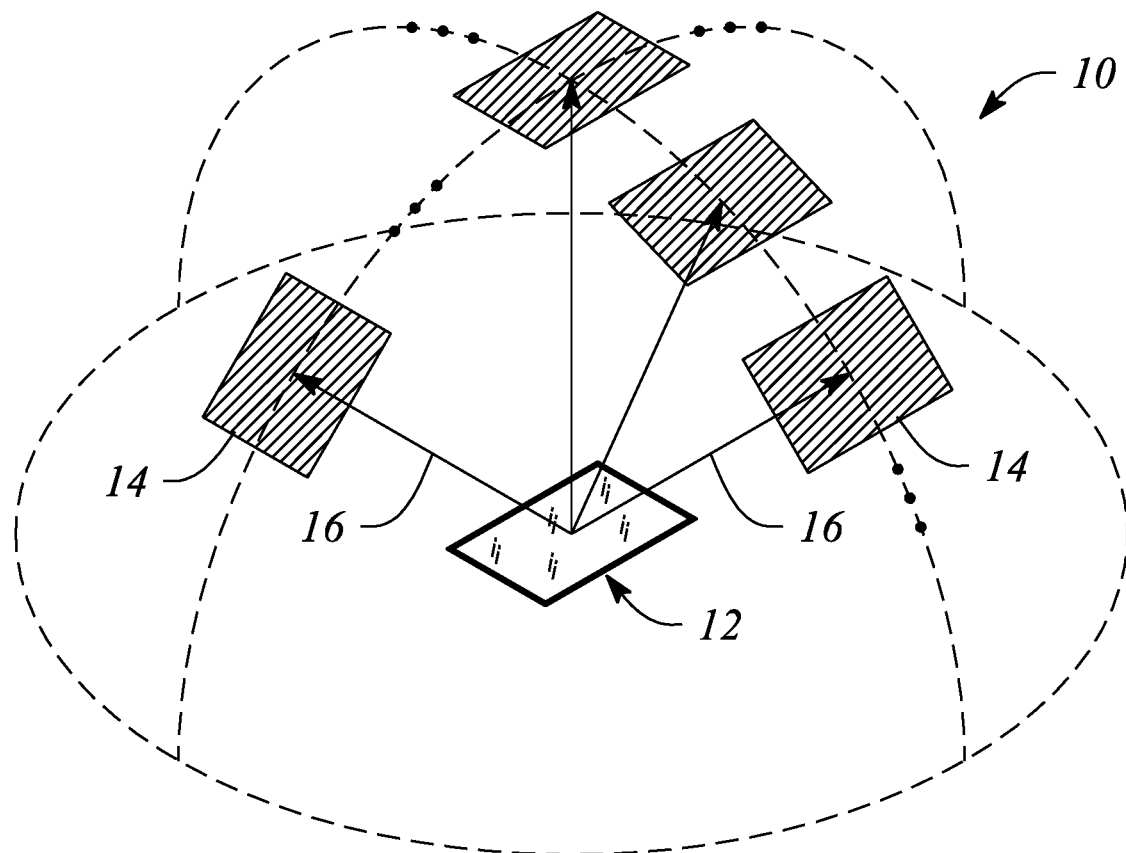
FIG. 1A illustrates a perspective view of a multiview display in an example, according to an embodiment consistent with the principles described herein.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide mode-selectable backlighting with application to a mode-selectable display. Embodiments consistent with the principles described herein provide a mode-selectable backlight employing a plurality of directional scattering features configured to provide emitted light by scattering out of a light guide a portion of guided light propagating within the light guide. Characteristics of the emitted light are mode-selectable by controlling a propagation direction of the guided light during different operational modes, according to various embodiments.

For example, during a first operational mode, a first directional scattering feature of the directional scattering feature plurality may be configured to provide first emitted light from guided light having a first propagation direction within a light guide. Alternatively, a second directional scattering feature of the directional scattering feature plurality may be configured to provide second emitted light from guided light having a second propagation direction within the light guide, in a second operational mode. In some embodiments, the first emitted light may be, but is not limited to, light that is diffuse or unidirectional. On the other hand, the second emitted light provided by the second directional scattering feature is directional comprising a plurality of directional light beams having different principal angular directions from one another, according to various embodiments.

In some embodiments, the first emitted light that is diffuse or unidirectional may provide backlighting that supports or facilitates the display of a two-dimensional (2D) image during the first operational mode. In the second operational mode, the directional light beams of the second emitted light may provide backlighting configured to support the display a multiview image (e.g., by a multiview display), the different principal angular directions corresponding to different view directions of various views of the multiview image (or equivalently of the multiview display). Uses of mode-selectable backlighting and mode-selectable displays described herein include, but are not limited to, mobile telephones (e.g., smart phones), watches, tablet computes, mobile computers (e.g., laptop computers), personal computers and computer monitors, automobile display consoles, cameras displays, and various other mobile as well as substantially non-mobile display applications and devices.

Herein a 'two-dimensional display' or '2D display' is defined as a display configured to provide a view of an image that is substantially the same regardless of a direction from which the image is viewed (i.e., within a predefined viewing angle or range of the 2D display). A conventional liquid crystal display (LCD) found in may smart phones and computer monitors are examples of 2D displays. In contrast herein, a 'multiview display' is defined as an electronic display or display system configured to provide different views of a multiview image in or from different view directions. In particular, the different views may represent different perspective views of a scene or object of the multiview image.

FIG. 1A illustrates a perspective view of a multiview display 10 in an example, according to an embodiment consistent with the principles described herein. As illustrated in FIG. 1A, the multiview display 10 comprises a screen 12 to display a multiview image to be viewed. The screen 12 may be a display screen of a telephone (e.g., mobile telephone, smart phone, etc.), a tablet computer, a laptop computer, a computer monitor of a desktop computer, a camera display, or an electronic display of substantially any other device, for example.

The multiview display 10 provides different views 14 of the multiview image in different view directions 16 relative to the screen 12. The view directions 16 are illustrated as arrows extending from the screen 12 in various different principal angular directions (or simply different directions); the different views 14 are illustrated as shaded polygonal boxes at the termination of the arrows (i.e., depicting the view directions 16); and only four views 14 and four view directions 16 are illustrated, all by way of example and not limitation. Note that while the different views 14 are illustrated in FIG. 1A as being above the screen, the views 14 actually appear on or in a vicinity of the screen 12 when the multiview image is displayed on the multiview display 10. Depicting the views 14 above the screen 12 is only for simplicity of illustration and is meant to represent viewing the multiview display 10 from a respective one of the view directions 16 corresponding to a particular view 14.

A view direction or equivalently a light beam having a direction corresponding to a view direction of a multiview display generally has a principal angular direction given by angular components $\{\theta, \phi\}$, by definition herein. The angular component $\theta$ is referred to herein as the 'elevation component' or 'elevation angle' of the light beam. The angular component $\phi$ is referred to as the 'azimuth component' or 'azimuth angle' of the light beam. By definition, the elevation angle $\theta$ is an angle in a vertical plane (e.g., perpendicular to a plane of the multiview display screen while the azimuth angle $\phi$ is an angle in a horizontal plane (e.g., parallel to the multiview display screen plane).

Figure 1B:
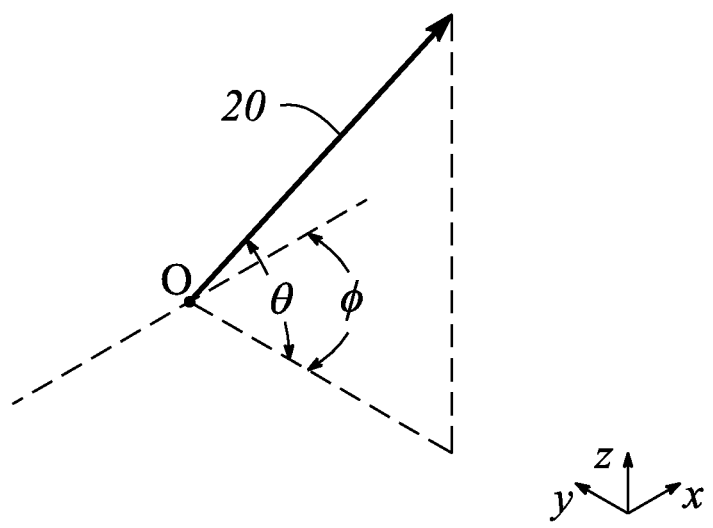
FIG. 1B illustrates a graphical representation of angular components of a light beam having a particular principal angular direction corresponding to a view direction of a multiview display in an example, according to an embodiment consistent with the principles described herein.

FIG. 1B illustrates a graphical representation of the angular components $\{\theta, \phi\}$ of a light beam 20 having a particular principal angular direction or 'direction' corresponding to a view direction (e.g., view direction 16 in FIG. 1A) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin O.

Further herein, the term 'multiview' as used in the terms 'multiview image' and 'multiview display' is defined as a plurality of views representing different perspectives or including angular disparity between views of the view plurality. In addition, herein the term 'multiview' explicitly includes more than two different views (i.e., a minimum of three views and generally more than three views), by definition herein. As such, 'multiview display' as employed herein is explicitly distinguished from a stereoscopic display that includes only two different views to represent a scene or an image. Note however, while multiview images and multiview displays may include more than two views, by definition herein, multiview images may be viewed (e.g., on a multiview display) as a stereoscopic pair of images by selecting only two of the multiview views to view at a time (e.g., one view per eye).

A 'multiview pixel' is defined herein as a set of sub-pixels or 'view' pixels in each of a similar plurality of different views of a multiview display. In particular, a multiview pixel may have an individual view pixel corresponding to or representing a pixel in each of the different views of the multiview image. Moreover, the view pixels of the multiview pixel are so-called 'directional pixels' in that each of the view pixels is associated with a predetermined view direction of a corresponding one of the different views, by definition herein. Further, according to various examples and embodiments, the different view pixels of a multiview pixel may have equivalent or at least substantially similar locations or coordinates in each of the different views. For example, a first multiview pixel may have individual view pixels located at $\{x_1, y_1\}$ in each of the different views of a multiview image, while a second multiview pixel may have individual view pixels located at $\{x_2, y_2\}$ in each of the different views, and so on.

In some embodiments, a number of view pixels in a multiview pixel may be equal to a number of views of the multiview display. For example, the multiview pixel may provide sixty-four (64) view pixels in associated with a multiview display having 64 different views. In another example, the multiview display may provide an eight by four array of views (i.e., 32 views) and the multiview pixel may include thirty-two (32) view pixels (i.e., one for each view). Additionally, each different view pixel may have an associated direction (e.g., light beam direction) that corresponds to a different one of the view directions corresponding to the 64 different views, for example. Further, according to some embodiments, a number of multiview pixels of the multiview display may be substantially equal to a number of 'view' pixels (i.e., pixels that make up a selected view) in the multiview display views. For example, if a view includes six hundred forty by four hundred eighty view pixels (i.e., a 640×480 view resolution), the multiview display may have three hundred seven thousand two hundred (307,200) multiview pixels. In another example, when the views include one hundred by one hundred pixels, the multiview display may include a total of ten thousand (i.e., 100×100=10,000) multiview pixels.

Herein, a 'light guide' is defined as a structure that guides light within the structure using total internal reflection or 'TIR'. In particular, the light guide may include a core that is substantially transparent at an operational wavelength of the light guide. In various examples, the term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small section of the plate light guide, the top and bottom surfaces are substantially parallel or co-planar.

In some embodiments, the plate light guide may be substantially flat (i.e., confined to a plane) and therefore, the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to ensure that total internal reflection is maintained within the plate light guide to guide light.

Herein, an 'angle-preserving scattering feature' or equivalently an 'angle-preserving scatterer' is any feature or scatterer configured to scatter light in a manner that substantially preserves in scattered light an angular spread of light incident on the feature or scatterer. In particular, by definition, an angular spread $\sigma_s$ of light scattered by an angle-preserving scattering feature is a function of an angular spread $\sigma$ of the incident light (i.e., $\sigma_s = f(\sigma)$). In some embodiments, the angular spread $\sigma_s$ of the scattered light is a linear function of the angular spread or collimation factor $\sigma$ of the incident light (e.g., $\sigma_s = a \cdot \sigma$, where a is an integer). That is, the angular spread $\sigma_s$ of light scattered by an angle-preserving scattering feature may be substantially proportional to the angular spread or collimation factor $\sigma$ of the incident light. For example, the angular spread $\sigma_s$ of the scattered light may be substantially equal to the incident light angular spread a (e.g., $\sigma_s \approx \sigma$). A uniform diffraction grating (i.e., a diffraction grating having a substantially uniform or constant diffractive feature spacing or grating pitch) is an example of an angle-preserving scattering feature. In contrast, a Lambertian scatterer or a Lambertian reflector as well as a general diffuser (e.g., having or approximating Lambertian scattering) are not angle-preserving scatterers, by definition herein.

Herein, a 'diffraction grating' is generally defined as a plurality of features (i.e., diffractive features) arranged to provide diffraction of light incident on the diffraction grating. In some examples, the plurality of features may be arranged in a periodic or quasi-periodic manner. For example, the diffraction grating may include a plurality of features (e.g., a plurality of grooves or ridges in a material surface) arranged in a one-dimensional (1D) array. In other examples, the diffraction grating may be a two-dimensional (2D) array of features. The diffraction grating may be a 2D array of bumps on or holes in a material surface, for example.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may couple light out of the light guide by diffraction. The diffraction grating also redirects or changes an angle of the light by diffraction (i.e., at a diffractive angle). In particular, as a result of diffraction, light leaving the diffraction grating generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively couple out the light from the light guide.

Further, by definition herein, the features of a diffraction grating are referred to as 'diffractive features' and may be one or more of at, in and on a material surface (i.e., a boundary between two materials). The surface may be a surface of a light guide, for example. The diffractive features may include any of a variety of structures that diffract light including, but not limited to, one or more of grooves, ridges, holes and bumps at, in or on the surface. For example, the diffraction grating may include a plurality of substantially parallel grooves in the material surface. In another example, the diffraction grating may include a plurality of parallel ridges rising out of the material surface. The diffractive features (e.g., grooves, ridges, holes, bumps, etc.) may have any of a variety of cross sectional shapes or profiles that provide diffraction including, but not limited to, one or more of a sinusoidal profile, a rectangular profile (e.g., a binary diffraction grating), a triangular profile and a saw tooth profile (e.g., a blazed grating).

According to various examples described herein, a diffraction grating (e.g., a diffraction grating of a multibeam element, as described below) may be employed to diffractively scatter or couple light out of a light guide (e.g., a plate light guide) as a light beam. In particular, a diffraction angle $\theta_m$ of or provided by a locally periodic diffraction grating may be given by equation (1) as:

$$\theta_m = \sin^{-1}\left(n\sin\theta_i - \frac{m\lambda}{d}\right) \quad (1)$$

where $\lambda$ is a wavelength of the light, m is a diffraction order, n is an index of refraction of a light guide, d is a distance or spacing between features of the diffraction grating, $\theta_i$ is an angle of incidence of light on the diffraction grating. For simplicity, equation (1) assumes that the diffraction grating is adjacent to a surface of the light guide and a refractive index of a material outside of the light guide is equal to one (i.e., $n_{out}=1$). In general, the diffraction order m is given by an integer. A diffraction angle $\theta_m$ of a light beam produced by the diffraction grating may be given by equation (1) where the diffraction order is positive (e.g., m>0). For example, first-order diffraction is provided when the diffraction order m is equal to one (i.e., m=1).

Figure 2:
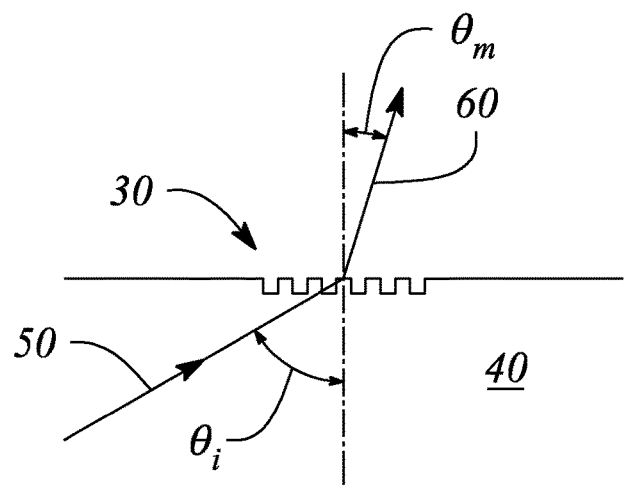
FIG. 2 illustrates a cross sectional view of a diffraction grating in an example, according to an embodiment consistent with the principles described herein.

FIG. 2 illustrates a cross sectional view of a diffraction grating 30 in an example, according to an embodiment consistent with the principles described herein. For example, the diffraction grating 30 may be located on a surface of a light guide 40. In addition, FIG. 2 illustrates a light beam 50 incident on the diffraction grating 30 at an incident angle $\theta_i$. The incident light beam 50 may be a guided light beam within the light guide 40. Also illustrated in FIG. 2 is a directional light beam 60 diffractively produced and coupled-out by the diffraction grating 30 as a result of diffraction of the incident light beam 50. The directional light beam 60 has a diffraction angle $\theta_m$ (or 'principal angular direction' herein) as given by equation (1). The diffraction angle $\theta_m$ may correspond to a diffraction order of the diffraction grating 30, for example.

Herein, a 'directional scattering feature' is defined a scattering structure that selectively or preferentially scatters light having a particular or predefined propagation direction, while either not scattering or substantially not scattering light having another or different propagation direction. For example, the directional scattering feature may be configured to selectively scatter light having first propagation direction. Further, the directional scattering feature may not scatter light having a second propagation direction that is different from the first propagation direction. As such, the directional scattering feature is directionally selective with respect to a direction of light incident on the directional scattering feature, by definition. By contrast, a Lambertian scattering structure (as well as similar scattering structures) is typically not a directional scattering feature, since this sort of scattering structure is inherently insensitive to a direction of incident light.

By definition herein, a 'multibeam element' is a structure or element of a backlight or a display that produces light that includes a plurality of light beams. In some embodiments, the multibeam element may be optically coupled to a light guide of a backlight to provide the plurality of light beams by coupling out a portion of light guided in the light guide. Further, the light beams of the plurality of light beams produced by a multibeam element have different principal angular directions from one another, by definition herein. In particular, by definition, a light beam of the plurality has a predetermined principal angular direction that is different from another light beam of the light beam plurality. As such, the light beam is referred to as a 'directional light beam' and the light beam plurality may be termed a 'directional light beam plurality, by definition herein.

Furthermore, the directional light beam plurality may represent a light field. For example, the directional light beam plurality may be confined to a substantially conical region of space or have a predetermined angular spread that includes the different principal angular directions of the light beams in the light beam plurality. Therefore, the predetermined angular spread of the directional light beams in combination (i.e., the light beam plurality) may represent the light field.

According to various embodiments, the different principal angular directions of the various directional light beams of the plurality are determined by a characteristic including, but not limited to, a size (e.g., length, width, area, etc.) of the multibeam element. In some embodiments, the multibeam element may be considered an 'extended point light source', i.e., a plurality of point light sources distributed across an extent of the multibeam element, by definition herein. Further, a directional light beam produced by the multibeam element has a principal angular direction given by angular components $\{\theta, \phi\}$, by definition herein, and as described above with respect to FIG. 1B.

Herein a 'collimator' is defined as substantially any optical device or apparatus that is configured to collimate light. According to various embodiments, an amount of collimation provided by the collimator may vary in a predetermined degree or amount from one embodiment to another. Further, the collimator may be configured to provide collimation in one or both of two orthogonal directions (e.g., a vertical direction and a horizontal direction). That is, the collimator may include a shape in one or both of two orthogonal directions that provides light collimation, according to some embodiments.

A 'collimation factor' is defined herein as a degree to which light is collimated. In particular, a collimation factor delineates an angular spread of light rays within a collimated beam of light, by definition herein. For example, a collimation factor $\sigma$ may specify that a majority of light rays in a beam of collimated light is within a particular angular spread (e.g., +/−$\sigma$ degrees about a central or principal angular direction of the collimated light beam). The light rays of the collimated light beam may have a Gaussian distribution in terms of angle and the angular spread may be an angle determined by at one-half of a peak intensity of the collimated light beam, according to some examples.

Herein, a 'light source' is generally defined as a source of light (e.g., an optical emitter configured to produce and emit light). For example, the light source may comprise an optical emitter such as a light emitting diode (LED) that emits light when activated or turned on. In particular, herein the light source may be substantially any source of light or comprise substantially any optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., white light). In some embodiments, the light source may comprise a plurality of optical emitters. For example, the light source may include a set or group of optical emitters in which at least one of the optical emitters produces light having a color, or equivalently a wavelength, that differs from a color or wavelength of light produced by at least one other optical emitter of the set or group. The different colors may include primary colors (e.g., red, green, blue) for example.

Herein, a 'viewbox' is defined as a region or volume of space in which an image formed by a display or other optical system (e.g., lens system) is visible and thus may be viewed. In other words, the viewbox defines a location or region in space within which a user's eyes may be placed in order to view an image produced by the display or display system. Moreover, the viewbox is generally large enough to accommodate both of a user's eyes. In some embodiments, the viewbox may represent a two dimensional region of space (e.g., a region with length and width but without substantial depth), while in other embodiments, the viewbox may include a three-dimensional region of space (e.g., a region with length, width and depth). Further, while referred to as a 'box', the viewbox may not be restricted to a box that is polygonal or rectangular in shape. For example, the viewbox may comprise a cylindrical region of space, in some embodiments. In other examples, the region of space may have various other shapes including, but not limited to, an elliptical cylinder, a hyperbolic cylinder and a general ellipsoid.

Further, as used herein, the article 'a' is intended to have its ordinary meaning in the patent arts, namely 'one or more'. For example, 'a directional scattering feature' means one or more directional scattering features and as such, 'the directional scattering feature' means 'the directional scattering feature(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 3A:
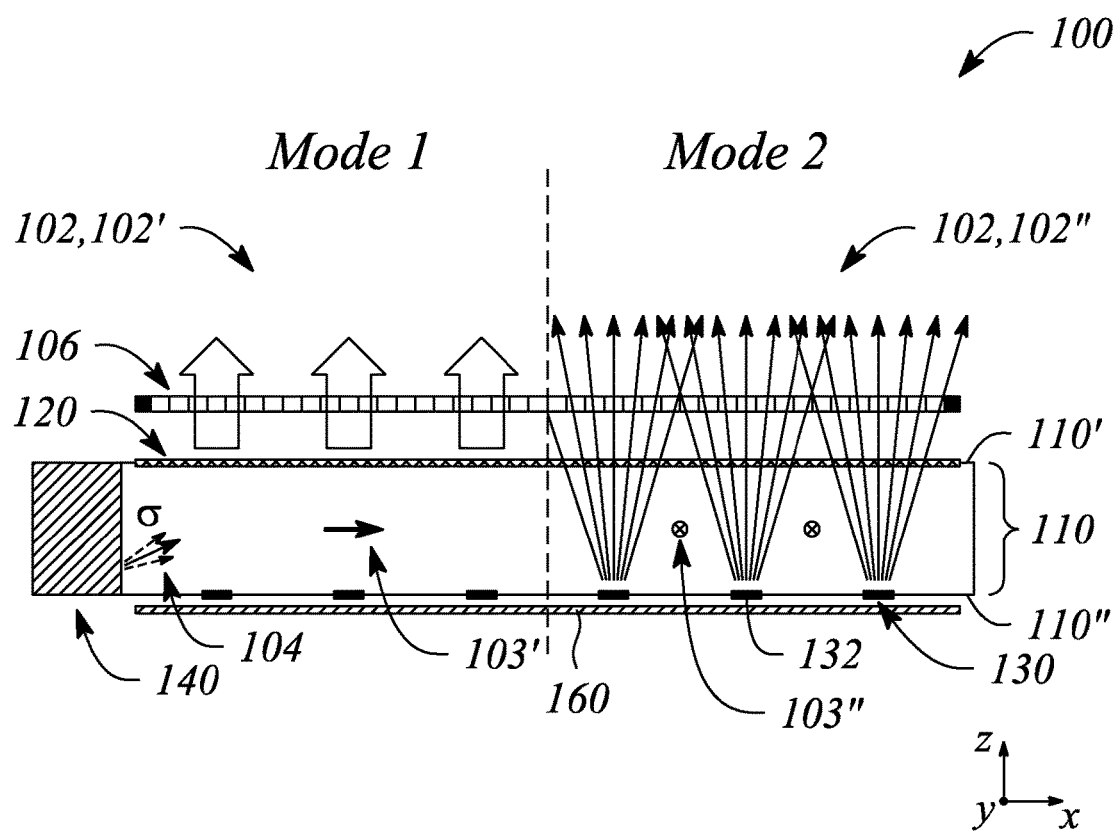
FIG. 3A illustrates a cross sectional view of a mode-selectable backlight in an example, according to an embodiment consistent with the principles described herein.
Figure 3B:
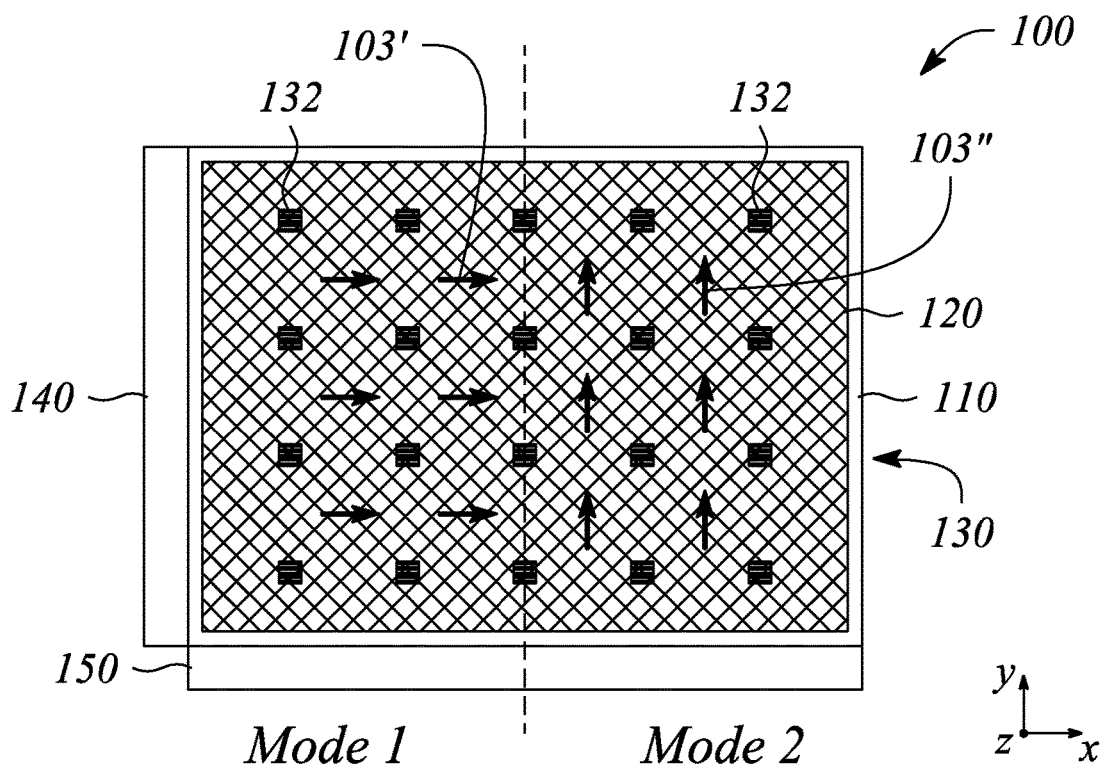
FIG. 3B illustrates a plan view of a mode-selectable backlight in an example, according to an embodiment consistent with the principles described herein.
Figure 3C:
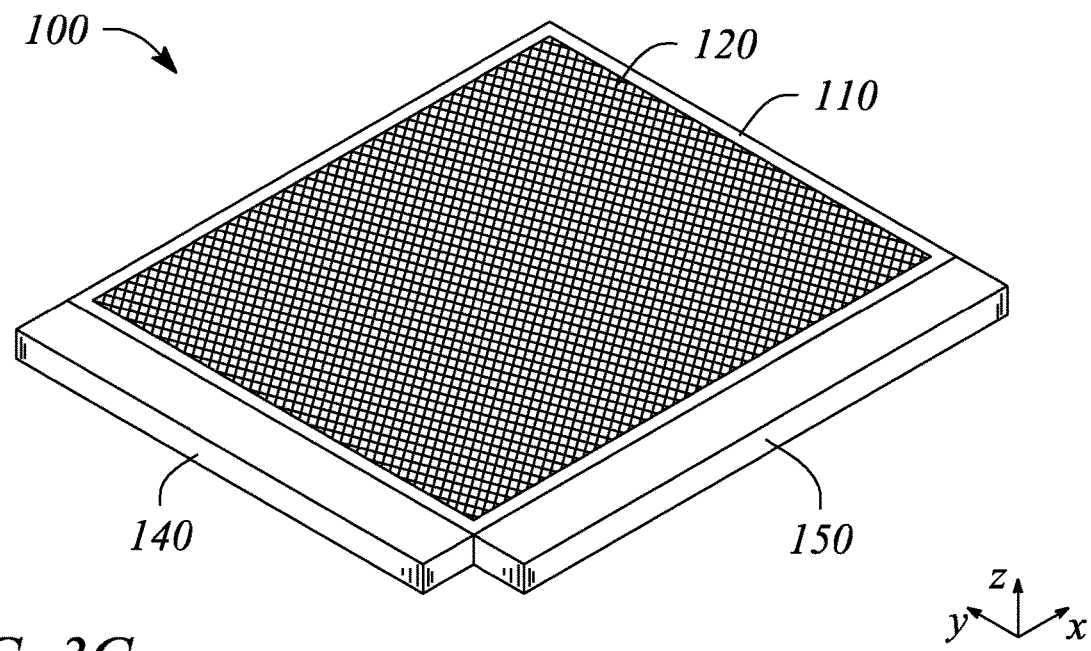
FIG. 3C illustrates a perspective view of a mode-selectable backlight in an example, according to an embodiment consistent with the principles described herein.

According to some embodiments of the principles described herein, a mode-selectable backlight is provided. FIG. 3A illustrates a cross sectional view of a mode-selectable backlight 100 in an example, according to an embodiment consistent with the principles described herein. FIG. 3B illustrates a plan view of a mode-selectable backlight 100 in an example, according to an embodiment consistent with the principles described herein. FIG. 3C illustrates a perspective view of a mode-selectable backlight 100 in an example, according to an embodiment consistent with the principles described herein. In FIGS. 3A and 3B, a first operational mode (Mode 1) of the mode-selectable backlight 100 is depicted in a left half of the figure and a second operational mode (Mode 2) is illustrated in a right half, i.e., respectively to a left and to a right of a dashed line in FIGS. 3A-3B.

The mode-selectable backlight 100 illustrated in FIGS. 3A-3C is configured to provide emitted light 102. The emitted light 102 is configured to have a direction that is generally away from a surface (e.g., an emission surface) of the mode-selectable backlight 100. In some embodiments, the emitted light 102 may be used in a variety of applications such as, but not limited to, to illuminate an array of light valves (e.g., light valves 106) in a display application, for example.

In various operational modes of the mode-selectable backlight 100, the emitted light 102 may have or exhibit different characteristics. For example, as described below in more detail, in a first operational mode, mode-selectable backlight 100 may provide the emitted light 102 having a single or substantially uniform direction. In other embodiments, the emitted light 102' provided in the first operational mode may be diffuse, substantially diffuse or at least lacking any specific or defined directionality. Herein, the emitted light 102 during the first operational mode (Mode 1) may be referred to as 'first' emitted light 102' to distinguish it from light emitted during other operational modes.

In a second operational mode (Mode 2, as illustrated) of the mode-selectable backlight 100, the emitted light 102 may comprise a plurality of directional light beams having different principal angular directions (or simply 'different directions') from one another. For example, the plurality of directional light beams may be or represent a light field. According to some embodiments, light beams the different principal angular directions of directional light beams of the emitted light 102 may correspond to respective view directions of a multiview image or a multiview display, in or during the second operational mode.

In some of these embodiments, the directional light beams of the emitted light 102 may be modulated (e.g., using light valves 106, as described below) to facilitate the display of information having multiview or 3D image content, for example. In other embodiments, the different principal angular directions of the directional light beams in the second operational mode may correspond to a direction toward a relatively limited region of space adjacent to or in front of the mode-selectable backlight 100, e.g., a viewbox. In these embodiments, the directional light beams of the emitted light 102 may be modulated (e.g., by the light valves) to provide image content in the viewbox, for example. Herein, the emitted light 102 during the second operational mode (Mode 2) may be referred to as 'second' emitted light 102" to distinguish it from light emitted during other operational modes such as, but not limited to, the first operational mode.

As illustrated in FIGS. 3A-3C, the mode-selectable backlight 100 comprises a light guide 110. The light guide 110 may be a plate light guide, according to some embodiments. The light guide 110 is configured to guide light along a length of the light guide 110 as guided light 104. For example, the light guide 110 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the guided light 104 according to one or more guided modes of the light guide 110, for example.

In some embodiments, the light guide 110 may be a slab or plate optical waveguide comprising an extended, substantially planar sheet of optically transparent, dielectric material. The substantially planar sheet of dielectric material is configured to guide the guided light 104 using total internal reflection. According to various examples, the optically transparent material of the light guide 110 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the light guide 110 may further include a cladding layer (not illustrated) on at least a portion of a surface (e.g., one or both of the top surface and the bottom surface) of the light guide 110. The cladding layer may be used to further facilitate total internal reflection, according to some examples.

Further, according to some embodiments, the light guide 110 is configured to guide the guided light 104 according to total internal reflection at a non-zero propagation angle between a first surface 110' (e.g., 'front' surface or side) and a second surface 110" (e.g., 'back' surface or side) of the light guide 110. In particular, the guided light 104 propagates by reflecting or 'bouncing' between the first surface 110' and the second surface 110" of the light guide 110 at the non-zero propagation angle. In some embodiments, the guided light 104 may comprise a plurality of guided light beams of different colors of light that are guided by the light guide 110 at respective ones of different color-specific, non-zero propagation angles. Note that the non-zero propagation angle is not illustrated in FIGS. 3A-3C for simplicity of illustration. However, a bold arrow in various figures depicting a propagation direction illustrates a general propagation direction of the guided light 104 along the light guide length.

As defined herein, a 'non-zero propagation angle' is an angle relative to a surface (e.g., the first surface 110' or the second surface 110") of the light guide 110. Further, the non-zero propagation angle is both greater than zero and less than a critical angle of total internal reflection within the light guide 110, according to various embodiments. Moreover, a specific non-zero propagation angle may be chosen (e.g., arbitrarily) for a particular implementation as long as the specific non-zero propagation angle is less than the critical angle of total internal reflection within the light guide 110. In various embodiments, the guided light 104 may be introduced or coupled into the light guide 110 at the non-zero propagation angle.

According to various embodiments, the guided light 104 or equivalently the guided 'light beam' produced by coupling light into the light guide 110 may be a collimated light beam. Herein, a 'collimated light' or 'collimated light beam' is generally defined as a beam of light in which rays of the light beam are substantially parallel to one another within the light beam (e.g., the guided light 104). Further, rays of light that diverge or are scattered from the collimated light beam are not considered to be part of the collimated light beam, by definition herein. In some embodiments, the mode-selectable backlight 100 may include a collimator such as, but not limited to, a lens, a reflector or mirror, or diffraction grating configured to collimate the light introduced into the light guide 110. In some embodiments, a source of light (e.g., a light source) may comprise a collimator. The guided light 104 may be collimated according to or having a collimation factor σ, as defined above, in various embodiments.

According to various embodiments, the mode-selectable backlight 100 further comprises a first directional scattering feature 120. The first directional scattering feature 120 is configured to provide first emitted light 102' from guided light 104 having a first propagation direction within the light guide 110. In particular, the first directional scattering feature 120 is configured to preferentially or selectively scatter the guided light 104 having the first propagation direction as opposed to guided light 104 having other propagation directions. For example, the first propagation direction may be in an x-direction (i.e., aligned with or along an x-axis) illustrated in FIGS. 3A-3C, by way of example and not limitation. A bold arrow 103' in the left half of FIGS. 3A and 3B may represent the first propagation direction of the guided light 104, e.g., during or in the first operational mode (Mode 1). Thus, as illustrated in FIGS. 3A-3C, the first directional scattering feature 120 is configured to selectively scatter out guided light 104 propagating in the x-direction (as illustrated by the bold arrow 103') within the light guide 110 and not other directions (e.g., a y-direction).

According to various embodiments, the guided light 104 having the first propagation direction may be present during a first operational mode (Mode 1) of the mode-selectable backlight 100. In particular, the guided light 104 having the first propagation direction may be present exclusively during the first operational mode, in some embodiments. As such, selection of the first operational mode may be provided by the presence of the guided light 104 having the first propagation direction. For example, turning on a light source that provides the guided light 104 having the first propagation direction may select the first operation mode.

In some embodiments, the first emitted light 102' may be diffuse, or at least substantially diffuse, being emitted by the first directional scattering feature 120 of the mode-selectable backlight 100 according to a diffuse scattering pattern. In other embodiments, the first emitted light 102' may be substantially unidirectional light. FIG. 3A employs broad arrows to depict either of the diffuse scattering pattern or the substantially unidirectional light of the first emitted light 102', e.g., to distinguish from directional light beams of the second operational mode, as illustrated. In yet other embodiments (not illustrated), the first emitted light 102' may comprise directional light beams.

According to various embodiments, the first directional scattering feature 120 may comprise any of a variety of different scattering structures or scatterers configured to provide directional scattering including, but not limited to, a diffraction grating, a refractive scattering structure (e.g., various prismatic structures), a reflective scattering structure (e.g., faceted reflectors), a plasmonic or fluorescent scattering structure (e.g., anisotropic plasmonic or fluorescent resonators), and various combinations thereof. An orientation or rotation of the diffraction grating as well as an orientation various elements that make up the other scattering structures may be employed to provide directional scattering, for example. Whether the first emitted light provided by the first directional scattering feature 120 employing such scattering structures is diffuse, unidirectional or comprises directional light beams is dependent on a particular characteristic of the first directional scattering feature 120 as well as an angular spread or collimation factor σ of the guided light 104 having the first propagation direction, according to some embodiments.

For example, the first directional scattering feature 120 may comprise a diffraction grating on a surface of the light guide 110, the diffraction grating comprising substantially parallel grooves or ridges. The substantially parallel grooves or ridges may be oriented perpendicular or substantially perpendicular (e.g., including a curvature) to the first propagation direction of the guided light 104. When the guided light 104 encounters the diffraction grating of the first directional scattering feature 120, a portion thereof may be selectively scattered out as the first emitted light 102'. The selective scattering is a result of the substantially perpendicular orientation or equivalently the substantially perpendicular angle of incidence of the guided light 104 with respect to the diffraction grating orientation.

Further, since a diffraction grating (e.g., of the first directional scattering feature 120) may function as an angle-preserving scattering structure, when the guided light 104 having the first propagation direction has a relatively large collimation factor σ (i.e., a wide angular spread), first emitted light 102' having a corresponding wide beam spread may be provided. Thus, the first emitted light 102' provided by the first directional scattering feature 120 may be diffuse or substantially diffuse. Conversely, a relatively smaller collimation factor σ may be used to provide first emitted light 102' that has a more confined angular spread or that is substantially unidirectional. For example, the first emitted light 102' may comprise substantially parallel light beams that are emitted in a direction perpendicular to the light guide surface. In another example, first emitted light 102' that is diffuse or spread over a broad angular range may be provided by a first directional scattering feature 120 comprising a diffraction grating having a random or substantially random grating spacing as function of distance across the light guide 110. The randomized grating spacing may be employed with or without guided light 104 having a large collimation factor σ, for example.

In other examples, refractive or reflective scattering structures having facets aligned to provide directional scattering configured to selectively scatter the guided light 104 having a the first propagation direction may be used as the first directional scattering feature 120. As with the diffraction grating example above, a relatively large collimation factor σ of the guided light 104 having the first propagation direction may be employed to produce first emitted light 102' that is diffuse, while a relatively smaller collimation factor σ may yield first emitted light 102' that is substantially unidirectional or that has a predetermined direction, for example. First emitted light that is diffuse may also be provided using refractive or reflective scattering structures having facets with randomized slopes as the first directional scattering feature 120, for example.

As illustrated in FIGS. 3A-3C, the mode-selectable backlight 100 further comprises a second directional scattering feature 130. The second directional scattering feature 130 is configured to provide second emitted light 102" from guided light 104 having a second propagation direction within the light guide 110. In particular, the second emitted light 102" is provided by scattering or coupling out of the light guide 110 a portion of the guided light 104 having the second propagation direction. As illustrated in FIGS. 3A-3C, the second propagation direction may be in the y-direction (i.e., aligned with or along an y-axis), by way of example and not limitation. An arrow 103" pointing into a plane of FIG. 3A and a bold arrow 103" in FIG. 3B, both in right half of the respective figures, illustrate the second propagation direction of the guided light 104. Thus, as illustrated in FIGS. 3A-3C, the second directional scattering feature 130 may be configured to selectively scatter out guided light 104 propagating in the y-direction as illustrated by the bold arrow 103" and not other directions (e.g., the x-direction illustrated by the bold arrow 103'). Further, the second directional scattering feature 130 is configured to not scatter or at least substantially not scatter the guided light 104 having the first propagation direction. As such, the second directional scattering feature 130 does not produce scattered light (i.e., second emitted light 102") during the first operational mode, as illustrated in the right half of FIG. 3A.

As discussed above, the second emitted light 102" comprises a plurality of directional light beams having different principal angular directions from one another. As such and by definition, the second directional scattering feature 130 is configured to provide the plurality of directional light beams having the different principal angular directions. In right side of FIG. 3A (Mode 2), the plurality of directional light beams of the second emitted light 102" are depicted as separate arrows pointing in different directions to explicitly represent the different principal angular directions of the directional light beams.

According to various embodiments, the second directional scattering feature 130 may comprise any of a variety of different scattering structures that provide directional scattering and that may be configured to provide second emitted light 102" comprising the plurality of directional light beams. In particular, a scattering structure of the second directional scattering feature 130 may include, but is not limited to, a diffraction grating, a refractive scattering structure (e.g., various prismatic structures), a reflective scattering structure (e.g., faceted reflectors), a plasmonic or fluorescent scattering structure (e.g., anisotropic plasmonic or fluorescent resonators), and various combinations thereof configured to provide directional light beams having different principal angular directions from one another.

For example, the second directional scattering feature 130 may comprise a multibeam diffraction grating or a plurality thereof, as defined by Fattal et al., U.S. Pat. No. 9,128,226 B2. In another example, the second directional scattering feature 130 may comprise a multibeam element or a plurality of multibeam elements. According to various embodiments, the multibeam element may comprise one or more of a diffraction grating, a micro-reflective element and a micro-refractive element as described in more detail below. As with the first directional scattering feature 120, an orientation or rotation of the various scattering structures may be employed to provide directional scattering by the second directional scattering feature 130. Likewise, the collimation factor σ of the guided light 104 having the second propagation direction may be used to control an angular spread of the different principal angular directions of the directional light beams produced by the second directional scattering feature 130.

According to various embodiments, the guided light 104 having the second propagation direction may be present during the second operational mode (Mode 2) of the mode-selectable backlight 100. In some embodiments, the guided light 104 having the second propagation direction may be present exclusively during the second operational mode. Thus, the second directional scattering feature 130 may provide the second emitted light 102" from the guided light 104 only during the second operational mode, in some embodiments (e.g., Mode 2, as illustrated). In other embodiments, the guided light 104 having the second propagation direction may be present during both the first and second operational modes. In these embodiments, both the first and second directional scattering features 120, 130 may provide emitted light 102 including a combination of first and second emitted light 102', 102" during the first operational mode, while only the second directional scattering feature 130 provides the emitted light 102, 102" during the second operational mode. As with the first operational mode, mode-selection for the second operational mode may be provided by controlling a presence or absence of the guided light 104 having one or both the first and second propagation directions.

Further, FIG. 3A illustrates the first directional scattering feature 120 on the first surface 110' and the second directional scattering feature 130 on the second surface 110" of the light guide 110, by way of example and not limitation. As illustrated, the second directional scattering feature 130 is configured to scatter out a portion of the guided light 104 having the second propagation direction, the portion being scattered out through the first surface 110' to provide the second emitted light 102". Here, the first surface 110' of the light guide 110 may be referred to as the 'emission' surface. Further, the first directional scattering feature 120 may be configured to be transparent or at least substantially transparent to the directional light beams scattered out by the second directional scattering feature 130 as the second emitted light 102", according to various embodiments. In other embodiments (not illustrated), the first directional scattering feature 120 may be on the second surface 110" of the light guide 110 and the second directional scattering feature 130 may be on the first surface 110'.

Figure 4A:
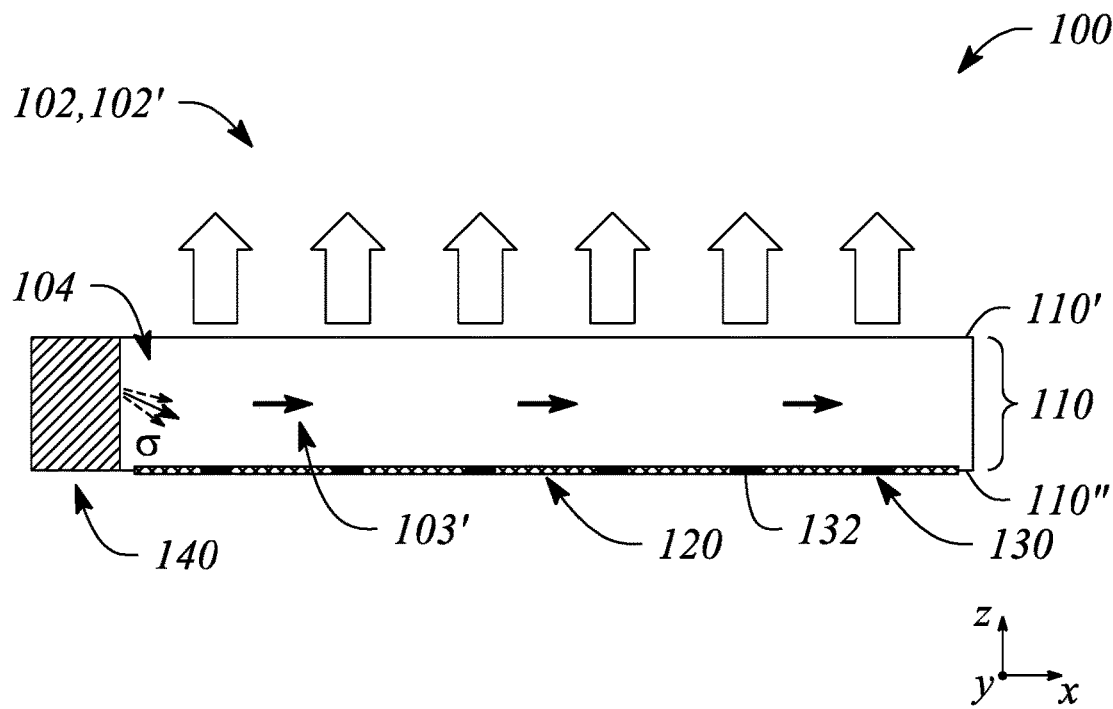
FIG. 4A illustrates a cross sectional view of a mode-selectable backlight in an example, according to another embodiment consistent with the principals described herein.
Figure 4B:
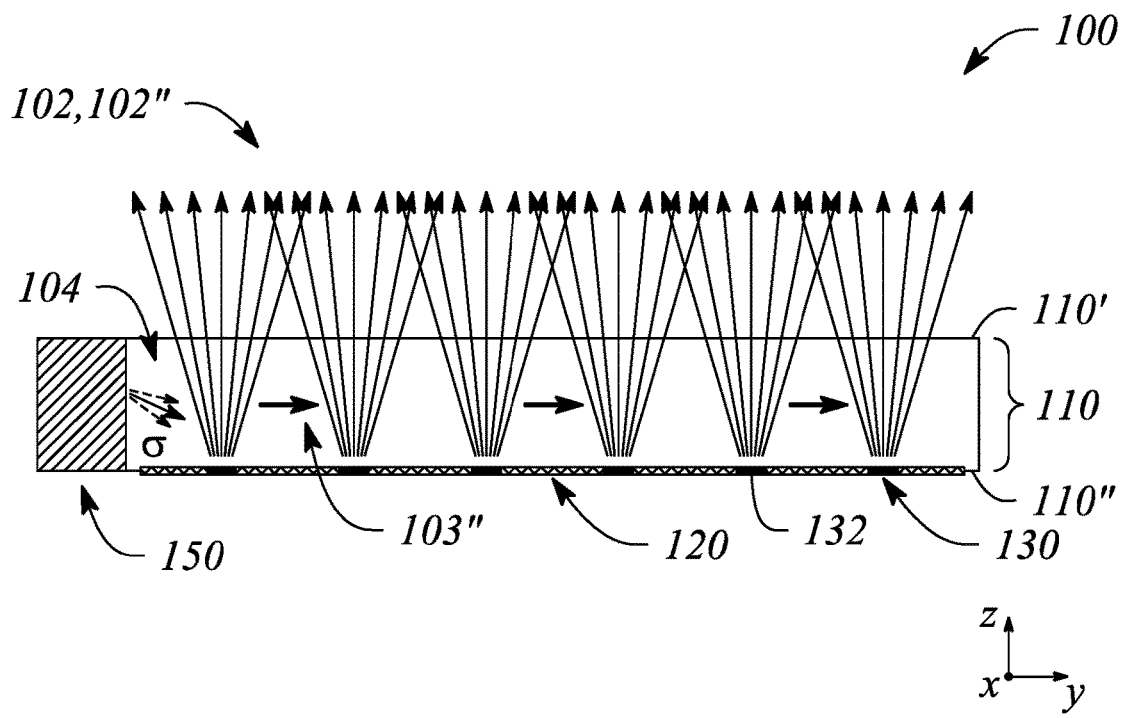
FIG. 4B illustrates a cross sectional view of the mode-selectable backlight illustrated in FIG. 4A in an example, according to an embodiment consistent with the principals described herein.

FIG. 4A illustrates a cross sectional view of a mode-selectable backlight 100 in an example, according to another embodiment consistent with the principals described herein. FIG. 4B illustrates a cross sectional view of the mode-selectable backlight 100 illustrated in FIG. 4A in an example, according to an embodiment consistent with the principals described herein. In particular, FIG. 4A illustrates the mode-selectable backlight 100 in the first operational mode (Mode 1), while FIG. 4B illustrates the mode-selectable backlight 100 in the second operational mode (Mode 2). Further, FIG. 4A illustrates the cross sectional view in an x-z plane and the cross sectional view of FIG. 4B illustrates the cross sectional view in a y-z plane.

FIGS. 4A and 4B illustrate the mode-selectable backlight 100 comprising the light guide 110 configured to guide light (i.e., guided light 104), the first directional scattering feature 120, and the second directional scattering feature 130. However, as illustrated in FIGS. 4A-4B the first directional scattering feature 120 and the second directional scattering feature 130 are on a common surface of the light guide 110, as opposed to being on opposite surfaces as was previously illustrated in FIG. 3A. In particular, FIGS. 4A-4B illustrate both of the first and second directional scattering features 120, 130 on a second surface 110" of the light guide 110. For example, the first directional scattering feature 120 may occupy a space between (e.g., surrounding) portions of the second directional scattering feature 130 on the second surface 110". In other embodiments (not illustrated), the first and second directional scattering features 120, 130 may be together on the first surface 110' of the light guide 110.

As illustrated in FIG. 4A, the first directional scattering feature 120 selectively scatters out guided light 104 having the first propagation direction. The guided light 104 is scattered out of the light guide 110 as first emitted light 102'. In FIG. 4A, the first propagation direction is illustrated by a bold arrow 103' that is parallel with the x-axis and the first emitted light 102' may be provided from the guided light 104 by the first directional scattering feature 120 as diffuse light having a relatively broad angular range (e.g., greater than sixty degrees). Further, FIG. 4A may represent the first operational mode, for example.

Referring to FIG. 4B, the second directional scattering feature 130 selectively scatters guided light 104 having the second propagation direction to provide the second emitted light 102" from the guided light 104, as illustrated. In particular, in FIG. 4B, the second propagation direction is depicted by a bold arrow 103" that is parallel with the y-axis. Further, as illustrated by individual arrows, the second emitted light 102" comprises the plurality of directional light beams having different principal angular directions from one another. Note that the first directional scattering feature 120 in FIG. 4B does not scatter any of the guided light 104 having the second propagation direction. Only the second directional scattering feature 130 scatters or couples out any of the guided light 104, as illustrated. FIG. 4B may represent the first operational mode, for example.

As described above, the guided light 104 having both the first propagation direction and the second propagation direction may be present during the first operational mode. As such, in some embodiments, both the first and second directional scattering features 120, 130 may scatter a portion of light from the guided light 104 during the first operational mode. For example, when the first directional scattering feature 120 is on the same surface of the light guide 110 as the second directional scattering features 130 (e.g., as in FIGS. 4A-4B), the second directional scattering feature 130 may be used to provide second emitted light 102" to effectively 'fill in' between regions of the emitted light 102 that include the first emitted light 102'. Providing emitted light 102 by filling in in this manner may yield more uniform emitted light 102 from the mode-selectable backlight 100 during the first operational mode, for example. However, in the second operational mode, the second directional scattering feature 130 may be employed alone or exclusively to provide the plurality of directional light beams of the second emitted light 102", according to these embodiments.

According to some embodiments, the mode-selectable backlight 100 may further comprise a plurality of light sources configured to provide the guided light 104 having the different propagation directions within the light guide 110. As illustrated FIGS. 3A-3C, the mode-selectable backlight 100 may further comprise a first light source 140 and a second light source 150. The first light source 140 may be configured to provide the guided light 104 having the first propagation direction within the light guide 110. Likewise, the second light source 150 may be configured to provide the guided light 104 having the second propagation direction within the light guide 110.

In FIGS. 3A-3C, the first light source 140 is located on a first side of the light guide 110 and the second light source 150 is located on a second side of the light guide 110 orthogonal to the first side. As illustrated, the first light sources 140 is configured to provide guided light 104 having a propagation direction (e.g., the first propagation direction) that is orthogonal to a propagation direction (e.g., the second propagation direction) of guided light 104 that the second light source 150 is configured to provide. FIG. 4A also illustrates the first light source 140, while FIG. 4B illustrates the second light source 150 of the mode-selectable backlight 100.

In various embodiments, the first and second light sources 140, 150 may comprise substantially any source of light (e.g., optical emitter) including, but not limited to, one or more light emitting diodes (LEDs) or a laser (e.g., laser diode). For example, the first and second light source 140, 150 may each comprise a plurality or an array of LEDs distributed along a length of a corresponding side of the light guide 110. In some embodiments, one or both of the first and second light sources 140, 150 may comprise an optical emitter configured produce a substantially monochromatic light having a narrowband spectrum denoted by a particular color. In particular, the color of the monochromatic light may be a primary color of a particular color space or color model (e.g., a red-green-blue (RGB) color model). In other examples, one or both of the first and second light sources 140, 150 may comprise a substantially broadband light source configured to provide substantially broadband or polychromatic light. For example, the broadband or polychromatic light may be white light and the first and second light sources 140, 150 may be white light sources. In some embodiments, one or both of the first and second light sources 140, 150 may comprise a plurality of different optical emitters configured to provide different colors of light or in combination to provide white light.

In some embodiments, one or both of the first and second light sources 140, 150 may further comprise a collimator (not illustrated). The collimator may be configured to receive substantially uncollimated light from one or more of the optical emitters of the respective first and second light sources 140, 150 and to convert the substantially uncollimated light into collimated light. In particular, the collimator may provide collimated light one or both of having the non-zero propagation angle and being collimated according to a predetermined collimation factor σ, according to some embodiments. Moreover, when optical emitters of different colors are employed, the collimator may be configured to provide the collimated light having one or both of different, color-specific, non-zero propagation angles and having different color-specific collimation factors. The collimator is further configured to communicate collimated light to the light guide 110 to propagate as the guided light 104, described above.

In various examples, the collimator may comprise any of a variety of optical elements configured to collimate light including, but not limited to, a lens, a reflector, and a diffraction grating. Another type of collimator that may be employed is a so-called tapered collimator comprising a section of tapered light guide. Collimators comprising various combinations of collimating structure may also be used, e.g., a collimator comprising a section of tapered light guide in combination with a collimating lens or reflector.

In some embodiments, one or both of the first light source 140 and the second light source 150 are configured to provide polarized light as the guided light within the light guide. For example, the first and second light source 140, 150 may comprise polarized optical emitters. In another example, the first and second light sources 140, 150 may include a polarizer at an output of the light sources 140, 150 or between the light sources 140, 150 and the light guide 110. According to various embodiments, one or both of the first directional scattering feature 120 is configured to provide polarized first emitted light 102' and the second directional scattering feature 130 is configured to provide the polarized second emitted light 102". In turn, each of the first and second directional scattering features 120, 130 are configured to provide the polarized first and second emitted light 102', 102" from the polarized light provided by respectively by the first and second light sources 140, 150, according to these embodiments. For example, one or both of the first and second directional scattering features 120, 130 may be polarization-preserving scattering features.

In some embodiments, the mode-selectable backlight 100 further comprises a reflector layer 160. The reflector layer 160 is located adjacent to the second surface 110" opposite the first surface 110' (i.e., emission surface) of the light guide 110, as illustrated in FIG. 3A. The reflector layer 160 is configured to reflect light in a direction back towards the first surface 110' of the light guide 110. For example, the reflector layer 160 may be configured to reflect light resulting from secondary scattering by one or both of the first directional scattering feature 120 and the second directional scattering feature 130. Herein, secondary scattering is defined as scattering in a secondary direction that is away from the first surface 110' of the light guide 110. Reflecting secondary scattering using the reflector layer 160 may enhance emission efficiency of the mode-selectable backlight 100 by increasing a brightness of the emitted light 102, in some embodiments.

The reflector layer 160 may comprise any of a variety of reflective materials and layers. For example, the reflector layer 160 may comprise a reflective metal. Reflective metals include, but are not limited to, silver, aluminum, chromium, nickel, copper and gold as well as various alloys and combinations thereof. In another example, the reflector layer 160 may comprise an enhance specular reflector (ESR) such as, but not limited to, Vikuiti™ Enhanced Specular Reflector Film available from 3M Optical Systems, St. Paul, Minn. In some embodiments (e.g., as illustrated in FIG. 3A), the reflector layer 160 may be separated by a gap from the second surface 110" of the light guide 110 to avoid interference with total internal reflection of the guided light 104 within the light guide 110. The gap may be filled with air or another low refractive index optical material (e.g., an optical adhesive), for example.

As discussed above, in some embodiments, the second directional scattering feature 130 may comprise a multibeam element 132. In particular, the second directional scattering feature 130 may comprise a plurality of multibeam elements 132. Each multibeam element 132 of the multibeam element plurality may be configured to provide the plurality of directional light beams having the different principal angular directions. In some embodiments, a size of the multibeam element 132 of the multibeam element plurality is comparable to a size of a light valve of a display that employs the mode-selectable backlight 100. In particular, the size of the multibeam element 132 may be between about fifty percent and about two hundred percent of the light valve size. An array of light valves 106 that may be used to modulate the emitted light 102 of the mode-selectable backlight 100 is illustrated in FIG. 3A, by way of example and not limitation.

The display that employs the mode-selectable backlight 100 may be a mode-selectable multiview display, for example. The array of light valves 106 may be part of the mode-selectable multiview display. The mode-selectable multiview display may provide a single or two-dimensional (2D) image in the first operational mode of the mode-selectable backlight 100 and a multiview image in the second operational mode. Further, in some embodiments, the principal angular directions of directional light beams of the directional light beam plurality correspond to view directions of different views of the multiview image.

Herein, the 'size' may be defined in any of a variety of manners to include, but not be limited to, a length, a width or an area. For example, the size of a light valve 106 may be a length thereof and the comparable size of the multibeam element 132 may also be a length, i.e., a length of the multibeam element 132. In another example, size may refer to an area such that an area of the multibeam element 132 is comparable to an area of the light valve. In yet another example, the size of the multibeam element 132 may be comparable to a spacing between adjacent the light valve (e.g., a center-to-center distance or inter-light valve spacing). According to some embodiments, the comparable sizes of the multibeam element 132 and the light valve 106 may be chosen to reduce, or in some examples to minimize, dark zones between views of the multiview image provided by the mode-selectable multiview display, while at the same time reducing, or in some examples minimizing, an overlap between views, for example.

In some embodiments (e.g., as illustrated in FIGS. 3A-3C), the mode-selectable backlight 100 may comprise a plurality of multibeam elements 132 that are spaced apart from one another along the light guide length. In particular, the multibeam elements 132 of the plurality are separated from one another by a finite space and represent individual, distinct elements along the light guide length. That is, by definition herein, the multibeam elements 132 of the plurality are spaced apart from one another according to a finite (i.e., non-zero) inter-element distance (e.g., a finite center-to-center distance). Further the multibeam elements 132 of the plurality generally do not intersect, overlap or otherwise touch one another, according to some embodiments. In other words, each multibeam element 132 of the plurality is generally distinct and separated from other ones of the multibeam elements 132.

According to some embodiments, the plurality of multibeam elements 132 of or within the second directional scattering feature 130 may be arranged as either a one-dimensional (1D) array or a two-dimensional (2D) array. For example, the plurality of multibeam elements 132 may be arranged as a linear 1D array. In another example, the plurality of multibeam elements 132 may be arranged as a rectangular 2D array or as a circular 2D array. Further, the array (i.e., 1D or 2D array) may be a regular or uniform array, in some examples. In particular, an inter-element distance (e.g., center-to-center distance or spacing) between the multibeam elements 132 may be substantially uniform or constant across the array. In other examples, the inter-element distance between the multibeam elements 132 may be varied one or both of across the array and along the length of the light guide 110.

According to various embodiments, the multibeam element 132 may comprise any of a number of different types of scattering structures or 'scatterers' configured to scatter or couple out a portion of the guided light 104 from within the light guide 110. Further, these different types of scattering structures provide or may be configured (e.g., using orientation) to provide directional scattering to selectively scatter out the guided light 104 having the second propagation direction. For example, the different scattering structures may include, but are not limited to, a diffraction grating, a micro-reflective element, a micro-refractive element, or various combinations thereof, each of which may be configured to provide directional scattering.

In particular, in some embodiments, the multibeam element 132 may comprise a diffraction grating configured to diffractively scatter out of the light guide 110 a portion of the guided light 104 having the second propagation direction as the plurality of directional light beams of the second emitted light 102". The diffraction grating of the multibeam element 132 may comprise a plurality of diffraction gratings or 'sub-gratings'. In other embodiments, the multibeam element 132 of the multibeam element plurality may comprise a micro-reflective element configured to reflectively scatter out of the light guide 110 a the portion of the guided light 104 having the second propagation direction as the plurality of directional light beams of the second emitted light 102". Further still, the multibeam element 132 of the multibeam element plurality may comprise a micro-refractive element configured to refractively scatter out of the light guide 110 a the portion of the guided light 104 having the second propagation direction as the plurality of directional light beams of the second emitted light 102", in yet other embodiments.

Figure 5:
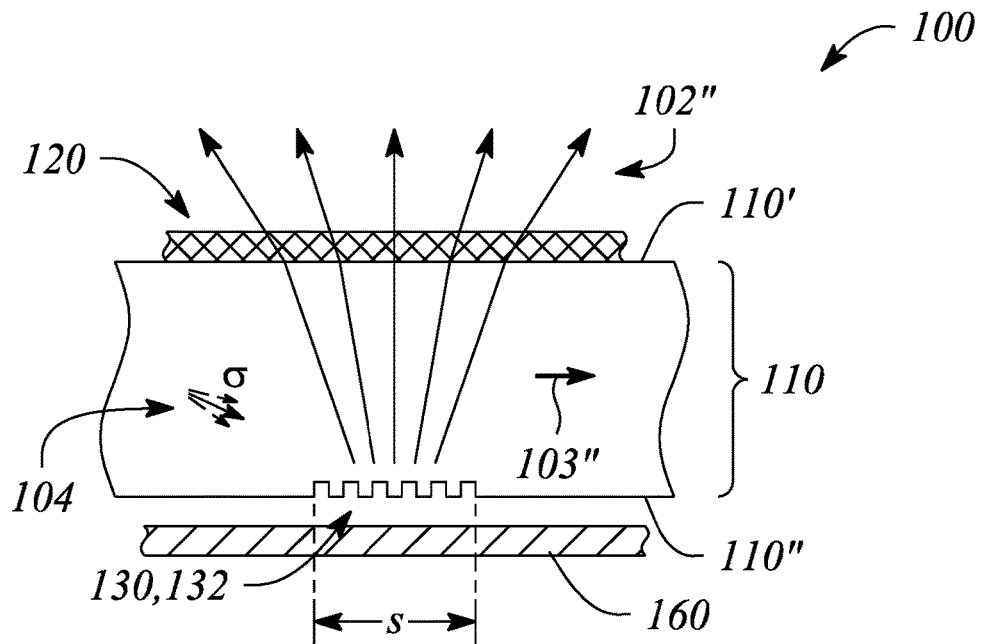
FIG. 5 illustrates a cross sectional view of a portion of a mode-selectable backlight in an example, according to an embodiment consistent with the principles described herein.

FIG. 5 illustrates a cross sectional view of a portion of a mode-selectable backlight 100 in an example, according to an embodiment consistent with the principles described herein. As illustrated in FIG. 5, the portion of the mode-selectable backlight 100 includes a portion of the light guide 110, a portion of the first directional scattering feature 120 on the first surface 110' of the light guide 110, and a portion of the second directional scattering feature 130 on the second surface 110". Further, the second directional scattering feature 130 comprises a multibeam element 132 implemented using a diffraction grating, as illustrated in FIG. 5.

The diffraction grating of the multibeam element 132 is configured to diffractively couple out a portion of the guided light 104 having the second propagation direction as the plurality of directional light beams of the second emitted light 102". According to various embodiments, a spacing or grating pitch of diffractive features in the diffraction grating may be sub-wavelength (i.e., less than a wavelength of the guided light 104). Further, the multibeam element 132, or equivalently the diffraction grating, has a size s, as illustrated in FIG. 5, as well as an orientation of the diffractive features that provides the selective scattering of the guided light 104 having the second propagation direction (i.e., as opposed to the guided light 104 having the first propagation direction). FIG. 5 also illustrates a portion of the reflector layer 160 adjacent to, but spaced apart from, the multibeam element 132. A bold arrow 103" indicates the second propagation direction in FIG. 5.

In some embodiments, the diffraction grating of the multibeam element 132 may be a uniform diffraction grating having a diffractive feature spacing that is substantially constant or unvarying throughout the diffraction grating. In other embodiments, the diffraction grating is a chirped diffraction grating. By definition, the 'chirped' diffraction grating is a diffraction grating exhibiting or having a diffraction spacing of the diffractive features (i.e., the grating pitch) that varies across an extent or length of the chirped diffraction grating. In some embodiments, the chirped diffraction grating may have or exhibit a chirp of the diffractive feature spacing that varies linearly with distance. As such, the chirped diffraction grating is a 'linearly chirped' diffraction grating, by definition. In other embodiments, the chirped diffraction grating of the may exhibit a non-linear chirp of the diffractive feature spacing. Various non-linear chirps may be used including, but not limited to, an exponential chirp, a logarithmic chirp or a chirp that varies in another, substantially non-uniform or random but still monotonic manner. Non-monotonic chirps such as, but not limited to, a sinusoidal chirp or a triangle or sawtooth chirp, may also be employed. Combinations of any of these types of chirps may also be employed.

In some embodiments, the multibeam element 132 or equivalently the diffraction grating thereof may comprise a plurality of diffraction gratings. The plurality of diffraction gratings may also be referred to as a plurality of 'sub-gratings' of the diffraction grating. The diffraction grating (or sub-grating) plurality of the multibeam element 132 may be arranged in a number of different configurations to selectively scatter or diffractively couple out a portion of the guided light 104 as the plurality of directional light beams. In particular, the plurality of diffraction gratings 122 of the multibeam element 132 may comprise a first diffraction grating and a second diffraction grating (or equivalently a first sub-grating and a second sub-grating). The first diffraction grating may be configured to provide a first light beam of the plurality of directional light beams, while the second diffraction grating may be configured to provide a second light beam of the plurality of directional light beams. According to various embodiments, the first and second light beams may have different principal angular directions from one another. Moreover, the plurality of diffraction gratings may comprise a third diffraction grating, a fourth diffraction grating and so on, each diffraction grating being configured to provide other directional light beams, according to some embodiments.

In some embodiments, one or more of the diffraction gratings of the diffraction grating plurality may provide more than one of the directional light beams. Further, the different directional light beams provided by the diffraction gratings may have different principal angular directions along a horizontal axis (e.g., x-direction or θ angular component) and a vertical axis (e.g., y-direction or φ angular component) from one another. Control of the different principal angular directions of individual directional light beams provided by the diffraction gratings may facilitate multiview displays having one or both of horizontal-only parallax, full two-dimensional parallax and variations between horizontal-only and full parallax.

Figure 6A:
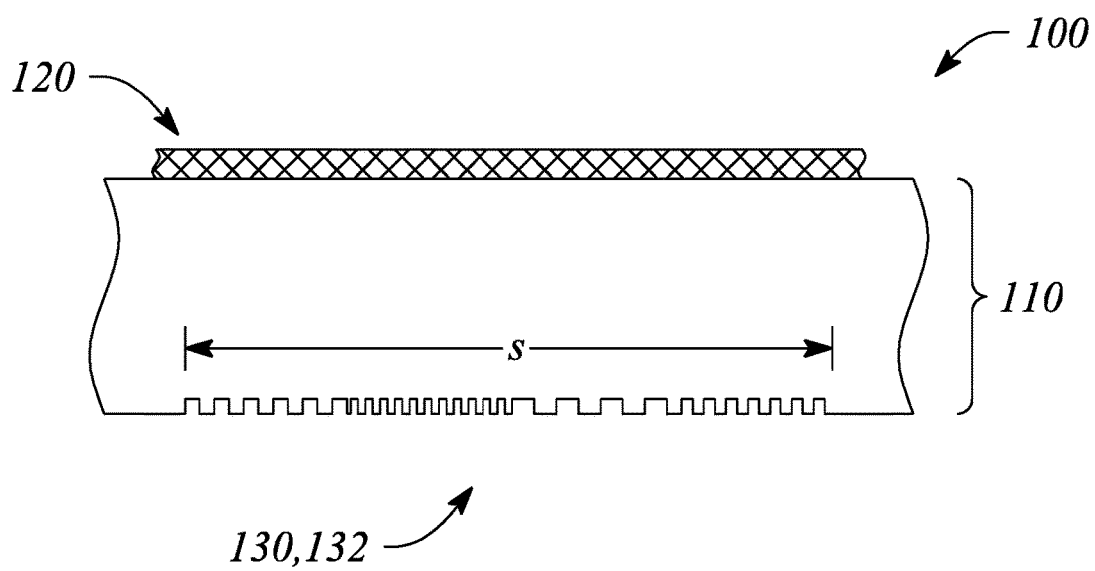
FIG. 6A illustrates a cross sectional view of a portion of a mode-selectable backlight including a plurality of diffraction gratings of a multibeam element in an example, according to an embodiment consistent with the principles described herein.
Figure 6B:
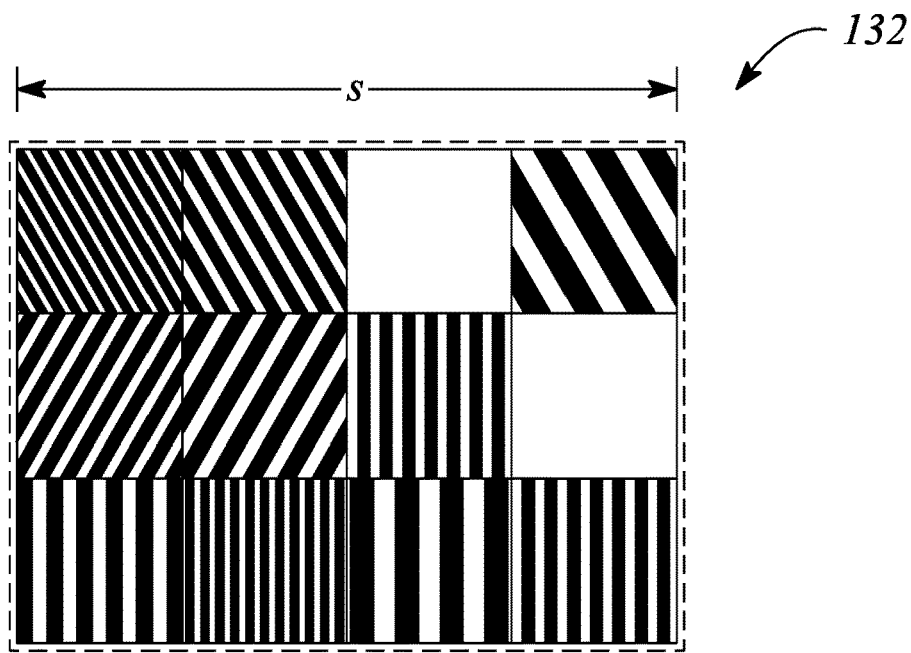
FIG. 6B illustrates a plan view of the plurality of diffraction gratings illustrated in FIG. 6A in an example, according to an embodiment consistent with the principles described herein.

FIG. 6A illustrates a cross sectional view of a portion of a mode-selectable backlight 100 including a plurality of diffraction gratings of a multibeam element 132 in an example, according to an embodiment consistent with the principles described herein. FIG. 6B illustrates a plan view of the plurality of diffraction gratings illustrated in FIG. 6A in an example, according to an embodiment consistent with the principles described herein. The cross sectional view in FIG. 6A may represent a cross section taken from left to right through a bottom row of diffraction gratings illustrated in FIG. 6B, for example. As illustrated in FIGS. 6A and 6B, different ones of the diffraction gratings have a different diffraction grating pitch or diffractive feature spacing from other diffraction gratings of the diffraction grating plurality. Further, some of the diffraction gratings have a different grating orientation (i.e., a different rotation), as illustrated. A size s of the multibeam element 132 that includes the plurality of diffraction gratings is illustrated in both FIGS. 6A and 6B, while a boundary of the multibeam element 132 is illustrated in FIG. 6B using a dashed line. In FIGS. 6A-6B, the illustrated multibeam element 132 may represent a portion of the second directional scattering feature 130 of the mode-selectable backlight 100. FIG. 6A further illustrates a portion of the light guide 110 along with a first directional scattering feature 120, by way of example and not limitation.

According to some embodiments, a differential density of diffraction gratings (or sub-gratings) within the diffraction grating plurality between different multibeam elements 132 of the mode-selectable backlight 100 may be configured to control a relative intensity of the plurality of directional light beams diffractively scattered or coupled out by respective different multibeam elements 132. In other words, the multibeam elements 132 may have different densities of diffraction gratings (or sub-gratings) therein and the different densities (i.e., the differential density of the diffraction gratings) may be configured to control the relative intensity of the plurality of directional light beams. For example, a multibeam element 132 having fewer diffraction gratings (or sub-gratings) within the diffraction grating plurality may produce a plurality of directional light beams having a lower intensity (or beam density) than another multibeam element 132 having relatively more diffraction gratings (or sub-gratings). The differential density of diffraction gratings (or sub-gratings) may be provided using locations within the multibeam element 132 that lack or are without a diffraction grating (or sub-gratings), for example.

Figure 7A:
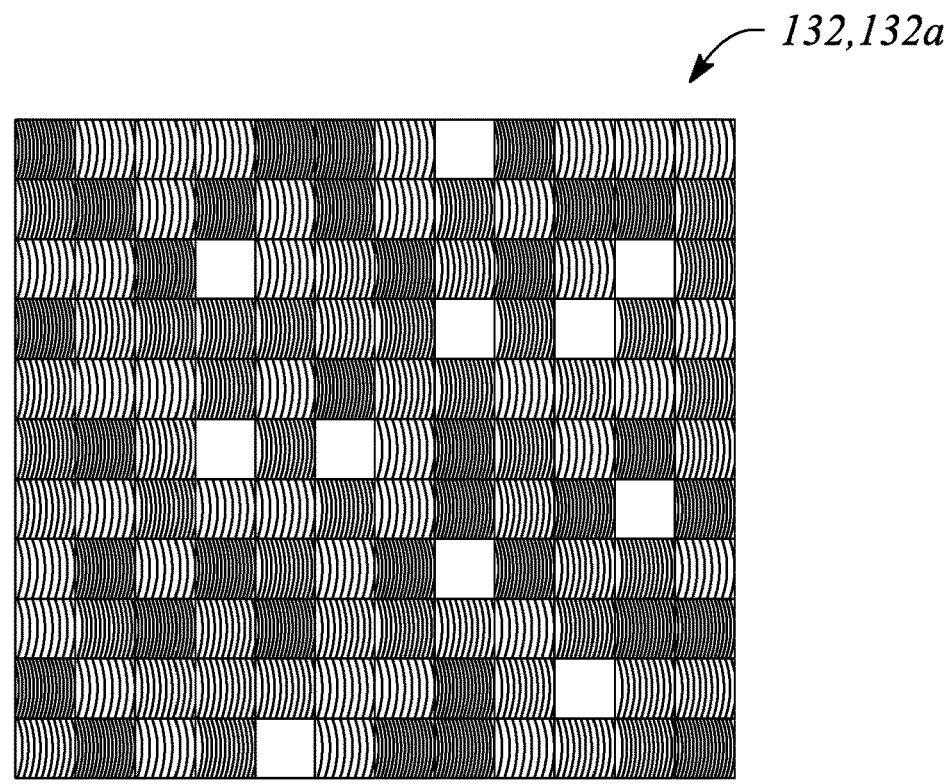
FIG. 7A illustrates a plan view of a multibeam element in an example, according to an embodiment consistent with the principles described herein.
Figure 7B:
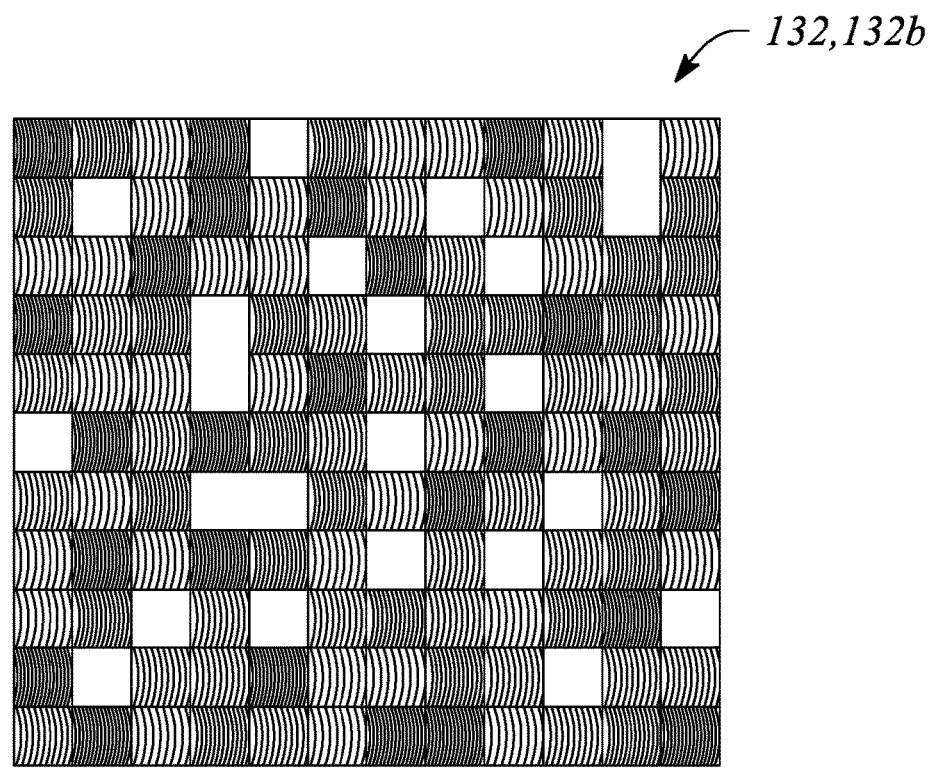
FIG. 7B illustrates a plan view of another multibeam element in an example, according to an embodiment consistent with the principles described herein.

FIG. 7A illustrates a plan view of a multibeam element 132a in an example, according to an embodiment consistent with the principles described herein. FIG. 7B illustrates a plan view of another multibeam element 132b in an example, according to an embodiment consistent with the principles described herein. Together, the multibeam elements 132a, 132b illustrated in FIGS. 7A and 7B represent a pair of multibeam elements 132. In each multibeam element 132a, 132b of the multibeam element pair, a different plurality of diffraction gratings (or sub-gratings) is illustrated. In particular, a first multibeam element 132a of the pair in FIG. 7A is illustrated with a higher density of diffraction gratings (or sub-gratings) than are present in a second multibeam element 132b of the pair. For example, the second multibeam element 132b has fewer diffraction gratings (or sub-gratings) and more locations without a diffraction grating than the first multibeam element 132a, as illustrated. By way of example and not limitation, FIGS. 7A-7B also illustrate diffraction gratings having curved diffractive features within the multibeam elements 132a, 132b.

Figure 8:
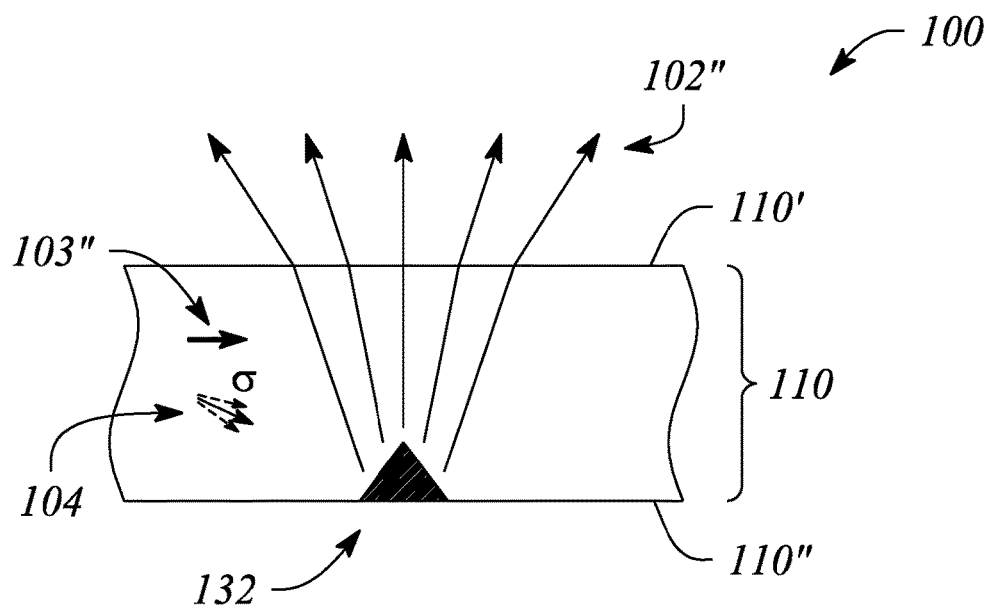
FIG. 8 illustrates a cross sectional view of a portion of a mode-selectable backlight including a multibeam element in an example, according to another embodiment consistent with the principles described herein.

FIG. 8 illustrates a cross sectional view of a portion of a mode-selectable backlight 100 including a multibeam element 132 in an example, according to another embodiment consistent with the principles described herein. In particular, FIG. 8 illustrates an embodiment of the multibeam element 132 comprising a micro-reflective element. Micro-reflective elements used as or in the multibeam element 132 may include, but are not limited to, a reflector that employs a reflective material or layer thereof (e.g., a reflective metal) or a reflector based on total internal reflection (TIR). According to some embodiments, the multibeam element 132 comprising the micro-reflective element may be located at or adjacent to a surface (e.g., the second surface 110", as illustrated) of the light guide 110. In other embodiments (not illustrated), the micro-reflective element may be located within the light guide 110 between the first and second surfaces 110', 110".

For example, FIG. 8 illustrates the multibeam element 132 comprising a micro-reflective element having reflective facets (e.g., a 'prismatic' micro-reflective element) located adjacent to the second surface 110" of the light guide 110. The facets of the illustrated prismatic micro-reflective element are configured to selectively reflect (i.e., reflectively couple) the portion of the guided light 104 having the second propagation direction out of the light guide 110. The facets may be slanted or tilted (i.e., have a tilt angle) and aligned (i.e., rotationally oriented) relative to the second propagation direction of the guided light 104 to selectively reflect the guided light portion out of light guide 110, for example. The facets may be formed using a reflective material within the light guide 110 or may be surfaces of a prismatic cavity in the second surface 110", according to various embodiments. When a prismatic cavity is employed, either a refractive index change at the cavity surfaces may provide reflection (e.g., TIR reflection) or the cavity surfaces that form the facets may be coated by a reflective material to provide reflection, in some embodiments. FIG. 8 also illustrates directional light beams of the second emitted light 102" and a bold arrow 103" indicating the second propagation direction of the guided light 104.

Figure 9:
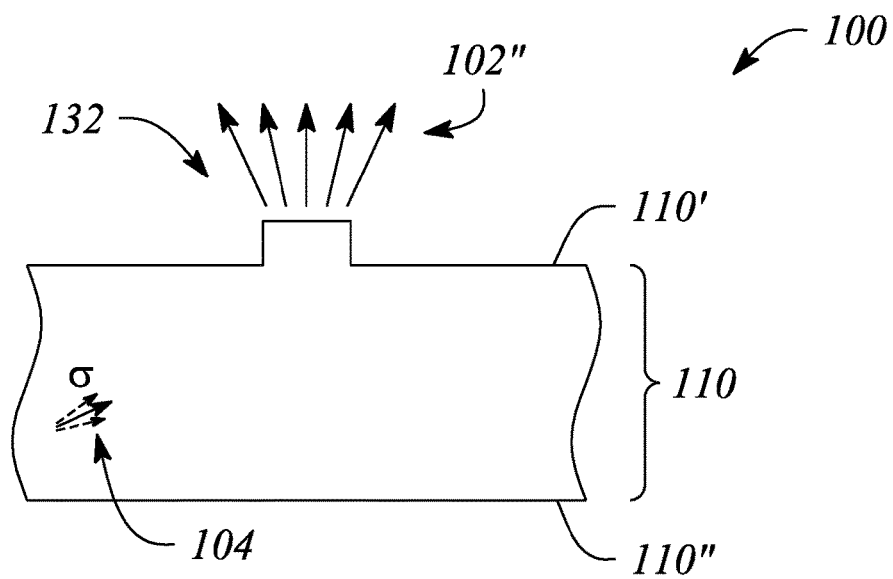
FIG. 9 illustrates a cross sectional view of a portion of a mode-selectable backlight including a multibeam element in an example, according to yet another embodiment consistent with the principles described herein.

FIG. 9 illustrates a cross sectional view of a portion of a mode-selectable backlight 100 including a multibeam element 132 in an example, according to yet another embodiment consistent with the principles described herein. In particular, FIG. 9 illustrates a multibeam element 132 comprising a micro-refractive element. According to various embodiments, the micro-refractive element is configured to refractively scatter or couple out a portion of the guided light 104 having the second propagation direction from the light guide 110. That is, the micro-refractive element is configured to employ refraction (e.g., as opposed to diffraction or reflection) to couple out the guided light portion from the light guide 110 as the directional light beams of the second emitted light 102", as illustrated in FIG. 9. The micro-refractive element may have various shapes including, but not limited to, a semi-spherical shape, a rectangular shape or a prismatic shape (i.e., a shape having sloped facets) having rotational orientations aligned with the second propagation direction of the guided light 104. According to various embodiments, the micro-refractive element may extend or protrude out of a surface (e.g., the first surface 110') of the light guide 110, as illustrated, or may be a cavity in the surface (not illustrated). Further, the micro-refractive element may comprise a material of the light guide 110, in some embodiments. In other embodiments, the micro-refractive element may comprise another material adjacent to, and in some examples, in contact with the light guide surface.

In some embodiments, the mode-selectable backlight 100 is configured to be substantially transparent to light in a direction through the light guide 110 orthogonal to a propagation direction of the guided light 104. In particular, the light guide 110, the first directional scattering feature 120, and the spaced apart plurality of multibeam elements 132 of the second directional scattering feature 130 may be configured to allow light to pass through the light guide 110 (i.e., through both the first surface 110' and the second surface 110"), in some embodiments. Transparency may be facilitated, at least in part, by the use of diffraction gratings in the first and second directional scattering features 120, 130, since diffraction gratings may be substantially transparent to light propagating orthogonal to the light guide surfaces 110', 110", for example.

In accordance with some embodiments of the principles described herein, a mode-selectable display is provided. The mode-selectable display is configured to emit modulated light as pixels of the mode-selectable display. In a first operational mode, the emitted modulated light may be diffuse or unidirectional to display a two-dimensional (2D) image. In a second operational mode, the emitted modulated light comprises a plurality of emitted modulated directional light beams having different directions from one another. In some embodiments, the emitted modulated directional light beams may be preferentially directed toward a plurality of different viewing directions of different views of to display of a multiview image. In particular, different ones of the modulated, differently directed directional light beams may correspond to individual pixels of different views (i.e., view pixels) associated with the multiview image, according to various examples. The different views may provide a 'glasses free' (e.g., autostereoscopic) representation of information in the multiview image being displayed by the mode-selectable display in the second operational mode, for example. The mode-selectable display may also be referred to as a mode-selectable multiview display herein.

Figure 10:
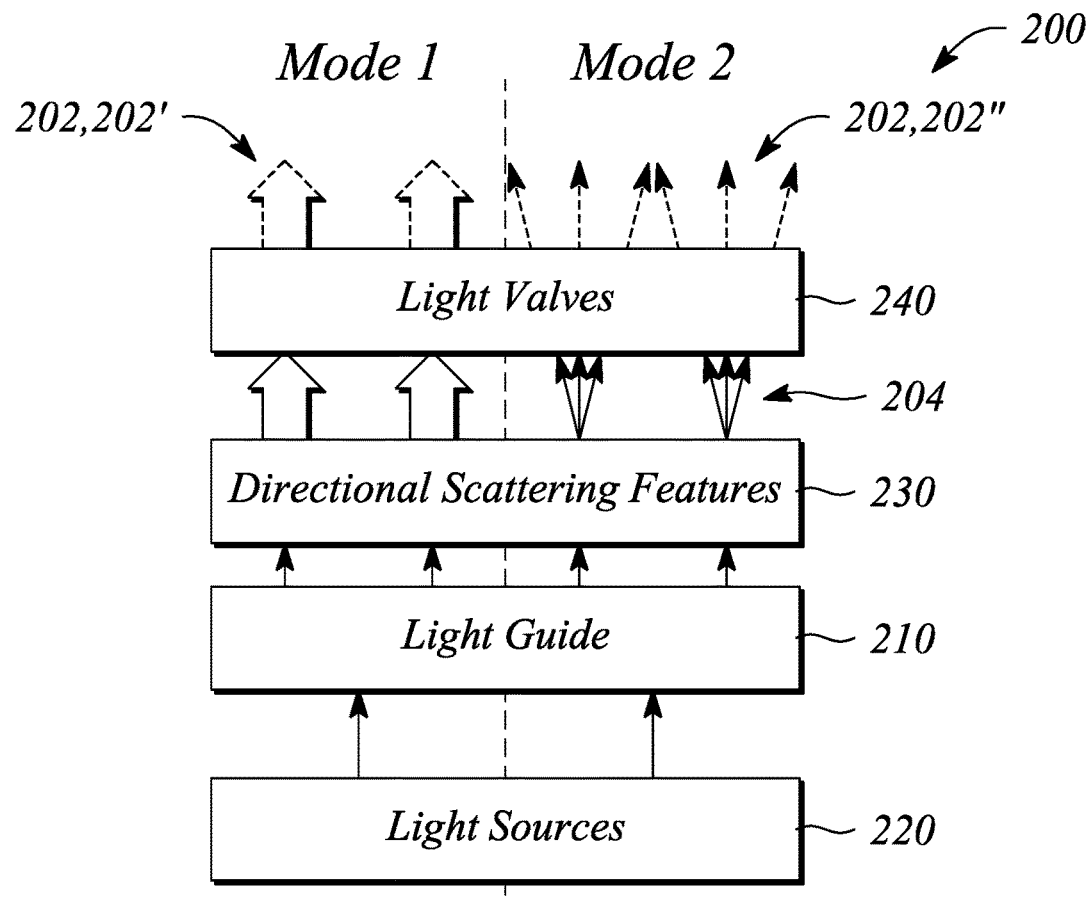
FIG. 10 illustrates a block diagram of a mode-selectable display in an example, according to an embodiment consistent with the principles described herein.

FIG. 10 illustrates a block diagram of a mode-selectable display 200 in an example, according to an embodiment consistent with the principles described herein. According to various embodiments, the mode-selectable display 200 is configured to display a 2D image in a first operational mode (Mode 1) and a multiview image according to different views in different view directions in a second operational mode (Mode 2). In particular, in the first operational mode, modulated light 202 emitted by the mode-selectable display 200 as first modulated emitted light 202' may be diffuse or unidirectional. The first modulated emitted light 202' may represent or be used to display the 2D image. In the second operational mode, modulated light 202 emitted by the mode-selectable display 200 as second modulated emitted light 202" comprises modulated directional light beams. The modulated light directional light beams of the second modulated emitted light 202" may represent or be used to display the multiview image. In particular, the modulated directional light beams may correspond to view pixels of the different views of the multiview image. Light beams of modulated emitted light 202" are illustrated using arrows having different directions in FIG. 10.

The mode-selectable display 200 illustrated in FIG. 10 comprises a light guide 210. The light guide 210 is configured to guide light as guided light. In some embodiments, the light guide 210 may be substantially similar to the light guide 110 of the mode-selectable backlight 100 described above. For example, the light guide 210 may be a plate light guide.

The mode-selectable display 200 further comprises a plurality of light source 220. The plurality of light sources 220 is configured to provide guided light having different propagation directions within the light guide. In particular, the guided light is provided in different propagation directions in or during different operational modes of the mode-selectable display 200. In some embodiment, the plurality of light sources 220 may be substantially similar to the first and second light sources 140, 150 described above with respect to the mode-selectable backlight 100.

In particular, a first light source of the plurality of light sources 220 may be substantially similar to the first light source 140, while a second light source of the plurality of light sources 220 may be substantially similar to the second light source 150. In some embodiments, the first light source 220 of the light source plurality may be located on a first side of the light guide 210 and a second light source 220 of the light source plurality may be located on a second side of the light guide 210 orthogonal to the first side. Further, the first light source 220 may be configured to provide guided light having a propagation direction that is orthogonal to or at least substantially orthogonal to a propagation direction of guided light provided by the second light source 220. In some embodiments, light sources 220 of the light source plurality are configured to provide guided light as polarized guided light within the light guide 210. For example, the plurality of light sources 220 may comprise polarized optical emitters or may include a polarizer to polarize light emitted by optical emitters of the light source 220.

As illustrated in FIG. 10, the mode-selectable display 200 further comprises a plurality of directional scattering features 230 configured to scatter the guided light out of the light guide as emitted light 204. According to various embodiments, each directional scattering feature 230 of the directional scattering feature plurality is configured to selectively scatter out guided light having a different one of the propagation directions. In some embodiments, a first directional scattering feature 230 of the directional scattering feature plurality may be substantially similar to the first directional scattering feature 120 described above with respect to the mode-selectable backlight 100. In some embodiments, a second directional scattering feature 230 of the directional scattering feature plurality may be substantially similar to the second directional scattering feature 130 of the mode-selectable backlight 100, described above. In particular, the emitted light 204 during a selected one of the operational modes comprises a plurality of directional light beams having different principal angular directions from one another. For example the second directional scattering feature 230 of the directional scattering feature plurality may be configured to provide the plurality of directional light beams, e.g., similar to the directional light beams provided by the second directional scattering feature 130.

The mode-selectable display illustrated in FIG. 10 further comprises an array of light valves 240. The array of light valves 240 is configured to modulate the emitted light as a displayed image. In particular, the array of light valves 240 are configured to receive the emitted light 204 from the plurality of directional scattering features 230 and to produce the modulated light 202. Further, in the first operational mode (Mode 1), the array of light valves 240 provides first modulated emitted light 202', while in the second operational mode (Mode 2), the array of light valves 240 provides second modulated emitted light 202", as illustrated. In various embodiments, different types of light valves may be employed as light valves 240 of the light valve array including, but not limited to, one or more of liquid crystal light valves, electrophoretic light valves, and light valves based on electrowetting. In some embodiments, the light valves 240 may be substantially similar to the light valves 106 described above with respect to the mode-selectable backlight 100.

In some embodiments, a directional scattering feature 230 of the directional scattering feature plurality configured to scatter the guided light out during the selected one of the operational modes comprises a plurality of multibeam elements. In some embodiment, the multibeam element may be substantially similar to the multibeam element 132 of the second directional scattering feature 130 described above with respect to the mode-selectable backlight 100. For example, a multibeam element of the multibeam element plurality may be configured to provide the plurality of directional light beams having the different principal angular directions. Further, the multibeam element may have a size that is greater than one half of a size of a light valve 240 of the light valve array and less than twice the light valve size, for example. In various embodiments, the multibeam element may comprises one or more of a diffraction grating, a micro-reflective element, and a micro-refractive element optically coupled to the light guide.

In some embodiments, the plurality of directional scattering features are configured to scatter the polarized guided light out of the light guide as emitted light 204 having a polarization corresponding to an input polarization of light valves of the light valve array. The input polarization may be an input polarization of a liquid crystal cell used as a light valve 240 of the light valve array, for example. In some embodiments, the polarized guided light may be provided by polarized light sources 220 of the light source plurality and directional scattering features of the directional scattering feature plurality may be configured as polarization-preserving scattering features.

In some embodiments, the different principal angular directions of the plurality of directional light beams of the emitted light 204 during the selected one of the operational modes may correspond to view directions of a views of a multiview display and the displayed image may be a multiview image. Further, during another operational mode other than the selected one of the operational modes, the emitted light may have a diffuse pattern and the displayed image may correspond to a two-dimensional (2D) image. Thus, the mode-selectable display 200 may be mode-selectable between displaying the 2D image and displaying the multiview image. In other embodiments, the different principal angular directions of the plurality of directional light beams of the emitted light during the selected one of the operational modes are directed toward a viewbox of the mode-selectable display 200. In these embodiments, the mode-selectable display 200 may be configured to be mode-selectable to provide the displayed image in a privacy mode in which the displayed image is only visible within the viewbox.

Figure 11:
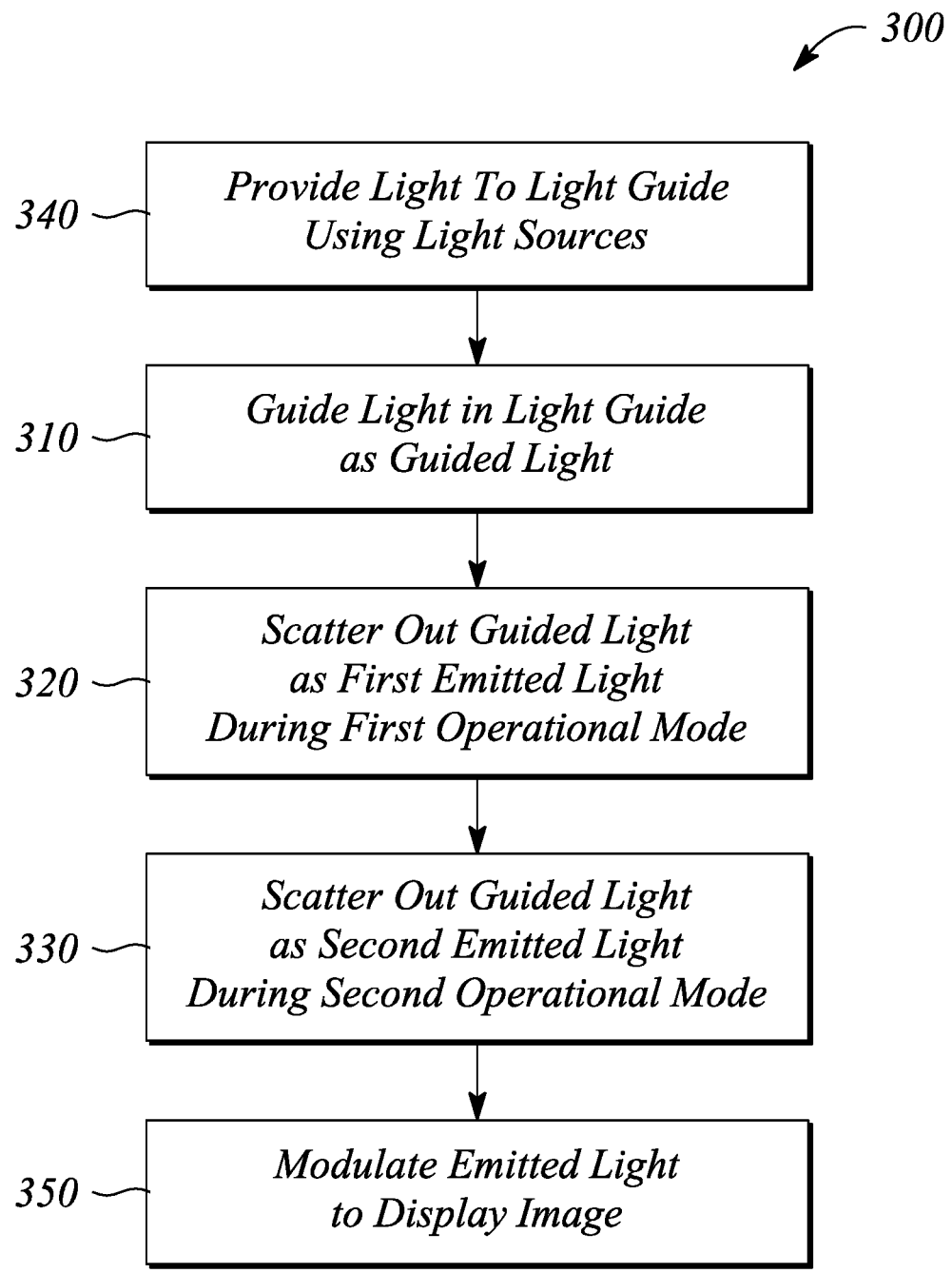
FIG. 11 illustrates a flow chart of a method of operating a mode-selectable backlight in an example, according to an embodiment consistent with the principles described herein.

In accordance with other embodiments of the principles described herein, a method of operating a mode-selectable backlight is provided. FIG. 11 illustrates a flow chart of a method 300 of operating a mode-selectable backlight in an example, according to an embodiment consistent with the principles described herein. As illustrated in FIG. 11, the method 300 of operating a mode-selectable backlight comprises guiding 310 light in a light guide as guided light. In some embodiments, the light may be guided 310 at a non-zero propagation angle. Further, the guided light may be collimated according to a predetermined collimation factor. Further still, the guided light may be polarized, in some embodiments. According to some embodiments, the light guide may be substantially similar to the light guide 110 described above with respect to the mode-selectable backlight 100. Similarly, the guided light may be substantially similar to the guided light 104 also described above.

As illustrated in FIG. 11, the method 300 of operating a multiview backlight further comprises scattering out 320 guided light from the light guide as first emitted light during a first operational mode using a first directional scattering feature. According to various embodiments, the guided light has a first propagation direction during the first operational mode. Moreover, the first directional scattering feature is configured to selectively scatter out 320 the guided light having the first propagation direction, e.g., as opposed to another propagation direction. In some embodiments, the first directional scattering feature may be substantially similar to the first directional scattering feature 120 of the mode-selectable backlight 100, described above.

The method 300 of operating a multiview backlight illustrated in FIG. 11 further comprises scattering out 330 guided light from the light guide as second emitted light during a second operational mode using a second directional scattering feature. During the second operational mode, the guided light has a second propagation direction. The first and second propagation directions are different, according to various embodiments. Further, the second emitted light comprises a plurality of directional light beams having different principal angular directions from one another. Moreover, the second directional scattering feature is configured to selectively scatter out 330 the guided light having the second propagation direction, e.g., as opposed to another propagation direction such as the first propagation direction. In some embodiments, the second propagation direction of the guided light may be orthogonal to or at least substantially orthogonal to the first propagation direction of the guided light. Further, in some embodiments, the second directional scattering feature may be substantially similar to the second directional scattering feature 130 described above with respect to the mode-selectable backlight 100.

In particular, in some embodiments, the second directional scattering feature may comprise a plurality of multibeam elements. Each multibeam element of the multibeam element plurality may be or comprise one or more of a diffraction grating, a micro-reflective element, and a micro-refractive element optically coupled to the light guide to provide the plurality of directional light beams having the different principal angular directions. In some embodiments, the plurality of multibeam elements may comprise a multibeam element that is substantially similar to the multibeam element 132 of the second directional scattering feature 130, described above.

In some embodiments (e.g., as illustrated), the method 300 of operating a mode-selectable backlight further comprises providing 340 light to the light guide using a plurality of light sources, the provided light to be guided 310 as the guided light. In various embodiments, the plurality of light sources may comprise a first light source configured to provide the guided light having the first propagation direction within the light guide. The first light source may be configured to provide the guided light during the first operational mode. The plurality of light sources may further comprise a second light source configured to provide guided light having the second propagation direction within the light guide. The second light source may be configured to provide the guided light during the first operational mode. In some embodiments, the first light source may be located on a first side of the light guide and the second light source may be located on a second side of the light guide orthogonal to the first side. The side locations of the first and second light source being orthogonal to one another may facilitate providing the guided light such that the first propagation direction is orthogonal to the second propagation direction. According to some embodiments, the plurality of light sources may be substantially similar to the plurality of light sources 220 of the mode-selectable display 200, while the first and second light sources may be substantially similar respectively to the first and second light sources 140, 150 of the mode-selectable backlight 100, described above.

As illustrated in FIG. 11, the method 300 of operating a mode-selectable backlight may further comprise modulating 350 the emitted light using a light valve of an array of light valves. The emitted light may be modulated 350 to display an image, for example. In particular, during the first operational mode the array of light valves may modulate 350 the first emitted light and during the second operational mode light valve array may modulate 350 the second emitted light. Moreover, the second emitted light comprises directional light beams of the directional light beam plurality, during the second operational mode. In some embodiments, the different principal angular directions of the plurality of directional light beams correspond to view directions of views of a multiview display or equivalently of a multiview image. Thus, the displayed image may be a multiview image during the second operational mode. In other embodiments, the different principal angular directions of the plurality of directional light beams of the second emitted light during the second operational modes are directed toward a viewbox in which the image is displayed. In these embodiments, the displayed image is displayed in a privacy mode in which the displayed image is only visible within viewbox.

In some embodiments, light valves of the light valve array may be substantially similar to the light valve 240 of the light valve array described above with respect to the mode-selectable display 200. According to some embodiments, a size of the multibeam element is comparable to a size of a light valve in the light valve array used in modulating 350 the emitted light. For example, the multibeam element may be greater than one half of the view pixel size and less than twice the view pixel size.

Thus, there have been described examples and embodiments of a mode-selectable backlight, mode-selectable display, and a method of operating a mode-selectable backlight that include a first directional scattering feature and a second directional scattering feature. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A mode-selectable backlight comprising:
   a light guide configured to guide light as guided light;
   a first directional scattering feature configured to provide first emitted light from the guided light having a first propagation direction within the light guide during a first operational mode; and
   a second directional scattering feature configured to provide second emitted light from the guided light having a second propagation direction within the light guide during a second operational mode, the second emitted light comprising a plurality of directional light beams having different principal angular directions from one another,
   wherein the first propagation direction differs from the second propagation direction.

2. The mode-selectable backlight of claim 1, wherein the second directional scattering feature comprises a plurality of multibeam elements, each multibeam element of the multibeam element plurality being configured to provide the plurality of directional light beams having the different principal angular directions.

3. The mode-selectable backlight of claim 2, wherein a size of the multibeam element of the multibeam element plurality is between fifty percent and two hundred percent of a size of a light valve of a multiview display that employs the mode-selectable backlight, the different principal angular directions of the plurality of directional light beams corresponding to view directions of different views of the multiview display.

4. The mode-selectable backlight of claim 2, wherein the multibeam element of the multibeam element plurality comprises one or more of:
   a diffraction grating configured to diffractively scatter out of the light guide a portion of the guided light having the second propagation direction as the plurality of directional light beams;
   a micro-reflective element configured to reflectively scatter out of the light guide a portion of the guided light having the second propagation direction as the plurality of directional light beams; and
   a micro-refractive element configured to refractively scatter out of the light guide a portion of the guided light having the second propagation direction as the plurality of directional light beams.

5. The mode-selectable backlight of claim 4, wherein the diffraction grating of the multibeam element comprises a plurality of diffraction gratings.

6. The mode-selectable backlight of claim 1, wherein the first directional scattering feature is located at a first surface of the light guide and the second directional scattering feature is located at a second surface of the light guide opposite the first surface, the second directional scattering feature being configured to scatter out a portion of the guided light having the second propagation direction through the first surface to provide the second emitted light.

7. The mode-selectable backlight of claim 6, further comprising a reflector layer adjacent to the second surface, the reflector layer being configured to reflect light emitted by the second directional scattering feature through the second surface of the light guide.

8. The mode-selectable backlight of claim 1, wherein the first directional scattering feature is configured to provide the first emitted light from the guided light having the first propagation direction according to a diffuse scattering pattern.

9. The mode-selectable backlight of claim 1, further comprising:
a first light source configured to provide the guided light having the first propagation direction within the light guide; and
a second light source configured to provide the guided light having the second propagation direction within the light guide,
wherein the first light source is located on a first side of the light guide and the second light source is located on a second side of the light guide orthogonal to the first side.

10. The mode-selectable backlight of claim 9, wherein one or both of the first light source and the second light source are configured to provide polarized light as the guided light within the light guide, one or both of the first directional scattering feature being configured to provide polarized first emitted light and the second directional scattering feature being configured to provide polarized second emitted light, each from the polarized light provided respectively by the first and second light sources.

11. A mode-selectable multiview display comprising the mode-selectable backlight of claim 1, the mode-selectable multiview display further comprising an array of light valves configured to modulate light emitted by the mode-selectable backlight, wherein during the first operational mode the array of light valves is configured to modulate the first emitted light and during the second operational mode the array of light valves is configured to modulate the second emitted light comprising directional light beams of the directional light beam plurality, a set of light valves of the light valve array corresponding to a multiview pixel of the mode-selectable multiview display during the second operational mode.

12. A mode-selectable display comprising:
a light guide configured to guide light;
a plurality of light sources configured to provide guided light having different propagation directions within the light guide during different operational modes;
a plurality of directional scattering features configured to scatter the guided light out of the light guide as emitted light, each directional scattering feature of the directional scattering feature plurality being configured to selectively scatter out guided light having a different one of the propagation directions; and
an array of light valves configured to modulate the emitted light as a displayed image,
wherein the emitted light during a selected one of the operational modes comprises a plurality of directional light beams having different principal angular directions from one another.

13. The mode-selectable display of claim 12, wherein a directional scattering feature of the directional scattering feature plurality configured to scatter the guided light out during the selected one of the operational modes comprises a plurality of multibeam elements, a multibeam element of the multibeam element plurality being configured to provide the plurality of directional light beams having the different principal angular directions and having a size that is greater than one half of a size of a light valve of the light valve array and less than twice the light valve size.

14. The mode-selectable display of claim 13, wherein the multibeam element comprises one or more of a diffraction grating, a micro-reflective element, and a micro-refractive element optically coupled to the light guide.

15. The mode-selectable display of claim 12, wherein a first light source of the light source plurality is located on a first side of the light guide and a second light source of the light source plurality is located on a second side of the light guide orthogonal to the first side, the first light source being configured to provide guided light having a propagation direction that is orthogonal to a propagation direction of guided light provided by the second light source.

16. The mode-selectable display of claim 12, wherein light sources of the light source plurality are configured to provide guided light as polarized guided light within the light guide, the plurality of directional scattering features being configured to scatter the polarized guided light out of the light guide as emitted light having a polarization corresponding to an input polarization of light valves of the light valve array.

17. The mode-selectable display of claim 12, wherein during another operational mode other than the selected one of the operational modes, the emitted light has a diffuse pattern and the displayed image corresponds to a two-dimensional (2D) image.

18. The mode-selectable display of claim 17, wherein the different principal angular directions of the plurality of directional light beams of the emitted light during the selected one of the operational modes correspond to view directions of views of a multiview display, the displayed image being a multiview image and the mode-selectable display being mode-selectable between displaying the 2D image and displaying the multiview image.

19. The mode-selectable display of claim 12, wherein the different principal angular directions of the plurality of directional light beams of the emitted light during the selected one of the operational modes are directed toward a viewbox of the mode-selectable display, the mode-selectable display being mode-selectable to provide the displayed image in a privacy mode in which the displayed image is only visible within viewbox.

20. A method of operating a mode-selectable backlight, the method comprising:
guiding light in a light guide as guided light;
scattering guided light out from within the light guide as first emitted light during a first operational mode using a first directional scattering feature, the guided light having a first propagation direction during the first operational mode; and
scattering guided light out from within the light guide as second emitted light during a second operational mode using a second directional scattering feature, the guided light having a second propagation direction during the second operational mode,
wherein the second emitted light comprises a plurality of directional light beams having different principal angular directions from one another, and wherein the first and second propagation directions are different.

21. The method of operating a mode-selectable backlight of claim 20, wherein the second directional scattering feature comprises a plurality of multibeam elements, each multibeam element of the multibeam element plurality being one or more of a diffraction grating, a micro-reflective element, and a micro-refractive element optically coupled to the light guide to provide the plurality of directional light beams having the different principal angular directions.

22. The method of operating a mode-selectable backlight of claim 20, further comprising providing light to the light guide to be guided as the guided light using a plurality of light sources, the plurality of light source comprising:
   a first light source configured to provide the guided light having the first propagation direction within the light guide; and
   a second light source configured to provide the guided light having the second propagation direction within the light guide,
wherein the first light source is located on a first side of the light guide and the second light source is located on a second side of the light guide orthogonal to the first side.

23. The method of operating a mode-selectable backlight of claim 20, further comprising modulating emitted light using an array of light valves to display an image, wherein during the first operational mode the array of light valves modulates the first emitted light and during the second operational mode the array of light valves modulates the second emitted light comprising directional light beams of the directional light beam plurality.

24. The method of operating a mode-selectable backlight of claim 23, wherein the different principal angular directions of the plurality of directional light beams correspond to view directions of views of a multiview display, the displayed image being a multiview image during the second operational mode.

* * * * *